United States Patent
Janaudy

(10) Patent No.: US 11,164,186 B2
(45) Date of Patent: Nov. 2, 2021

(54) METHODS, SYSTEMS, AND DEVICES FOR MANAGING DIGITAL ASSETS

(71) Applicant: Standard Chartered Bank (Singapore) Limited, Singapore (SG)

(72) Inventor: Thierry Janaudy, Singapore (SG)

(73) Assignee: Standard Chartered Bank (Singapore) Limited, Singapore (SG)

( * ) Notice: Subject to any disclaimer, the term of this patent is extended or adjusted under 35 U.S.C. 154(b) by 0 days.

(21) Appl. No.: 16/959,136

(22) PCT Filed: Oct. 10, 2019

(86) PCT No.: PCT/SG2019/050506
§ 371 (c)(1),
(2) Date: Jun. 29, 2020

(87) PCT Pub. No.: WO2021/071421
PCT Pub. Date: Apr. 15, 2021

(65) Prior Publication Data
US 2021/0135877 A1    May 6, 2021

(51) Int. Cl.
*H04L 9/06* (2006.01)
*G06Q 20/40* (2012.01)
(Continued)

(52) U.S. Cl.
CPC ....... *G06Q 20/401* (2013.01); *G06Q 30/0185* (2013.01); *G06Q 50/265* (2013.01);
(Continued)

(58) Field of Classification Search
CPC ....... H04L 9/3239; H04L 9/0643; H04L 9/30; H04L 9/3247; G06Q 30/0185; G06Q 50/625
See application file for complete search history.

(56) References Cited

U.S. PATENT DOCUMENTS

2016/0292680 A1* 10/2016 Wilson, Jr. ............ G06Q 20/40
2016/0300234 A1* 10/2016 Moss-Pultz .......... H04L 9/3263
(Continued)

FOREIGN PATENT DOCUMENTS

| CN | 107230053 | 10/2017 |
|----|-----------|---------|
| CN | 110061838 | 7/2019 |

OTHER PUBLICATIONS

International Search Report dated Dec. 6, 2019 of PCT/SG2019/050506.
(Continued)

*Primary Examiner* — Khoi V Le
(74) *Attorney, Agent, or Firm* — Baker & McKenzie LLP

(57) ABSTRACT

Embodiments relate to methods, systems, devices, and computer readable medium for managing digital assets, such as cryptocurrencies and public key and private key pairs. The method may include forming a first payload (or the owner payload). The first payload may include the public key of the digital asset or a corresponding public address for the public key of the digital asset. The method may also include performing a proof of ownership setup process for an owner of the digital asset. The proof of ownership setup process may include generating a proof of ownership hash. The proof of ownership hash may be generated by hashing at least the first payload. The method may also include signing, using the private key of the digital asset, the proof of ownership hash to arrive at a signed proof of ownership hash.

20 Claims, 12 Drawing Sheets

(51) Int. Cl.
*H04L 9/14* (2006.01)
*G06Q 30/00* (2012.01)
*G06Q 50/26* (2012.01)
*H04L 9/30* (2006.01)
*H04L 9/32* (2006.01)

(52) U.S. Cl.
CPC .............. *H04L 9/0643* (2013.01); *H04L 9/14* (2013.01); *H04L 9/30* (2013.01); *H04L 9/3239* (2013.01); *H04L 9/3247* (2013.01); *G06Q 2220/00* (2013.01); *H04L 2209/56* (2013.01)

(56) References Cited

U.S. PATENT DOCUMENTS

| | | | |
|---|---|---|---|
| 2018/0076957 A1* | 3/2018 | Watanabe | G06Q 20/3829 |
| 2018/0204192 A1* | 7/2018 | Whaley | G06Q 20/0658 |
| 2019/0173884 A1* | 6/2019 | Vincent | H04L 9/0643 |
| 2020/0067907 A1* | 2/2020 | Avetisov | H04L 9/3218 |

OTHER PUBLICATIONS

Written Opinion of the International Searching Authority dated Dec. 6, 2019 of PCT/SG2019/050506.

* cited by examiner

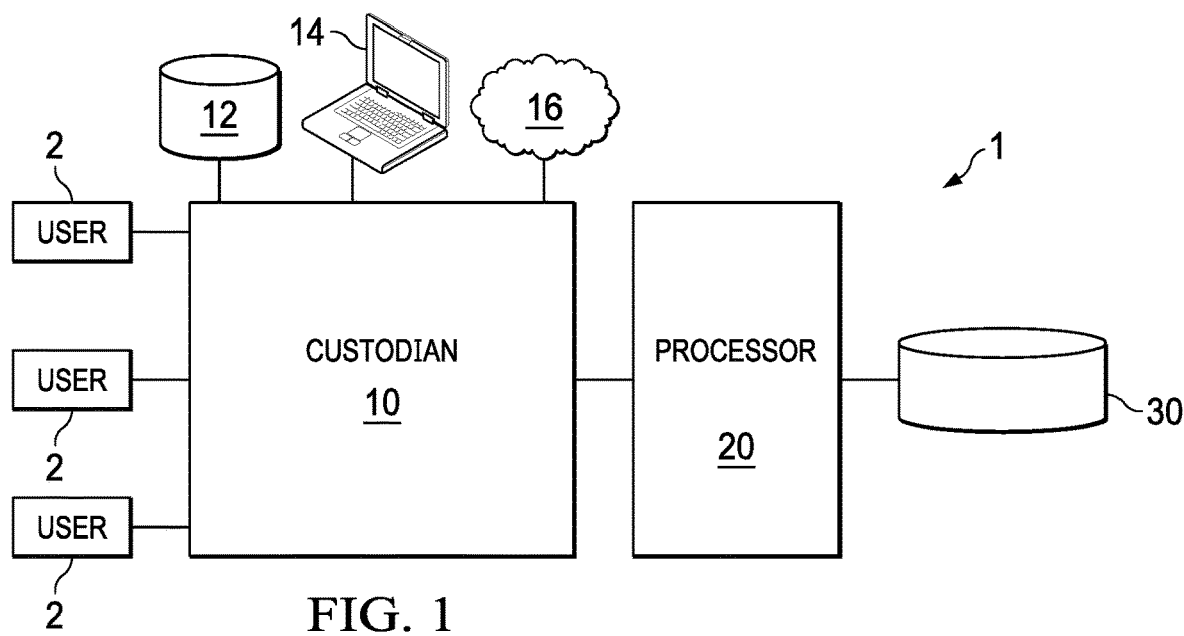
FIG. 1
FIG. 2
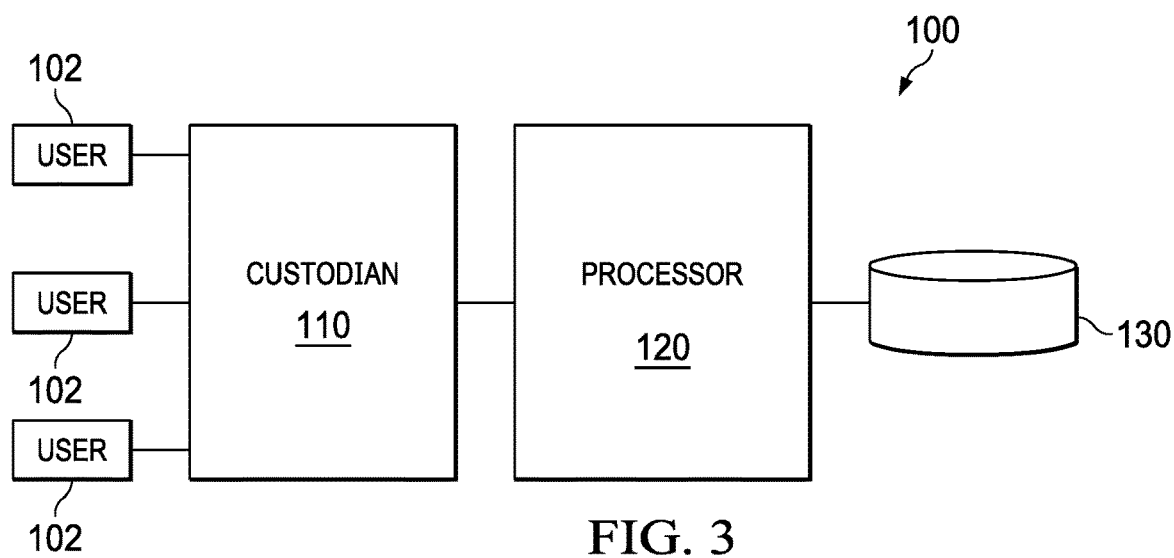
FIG. 3

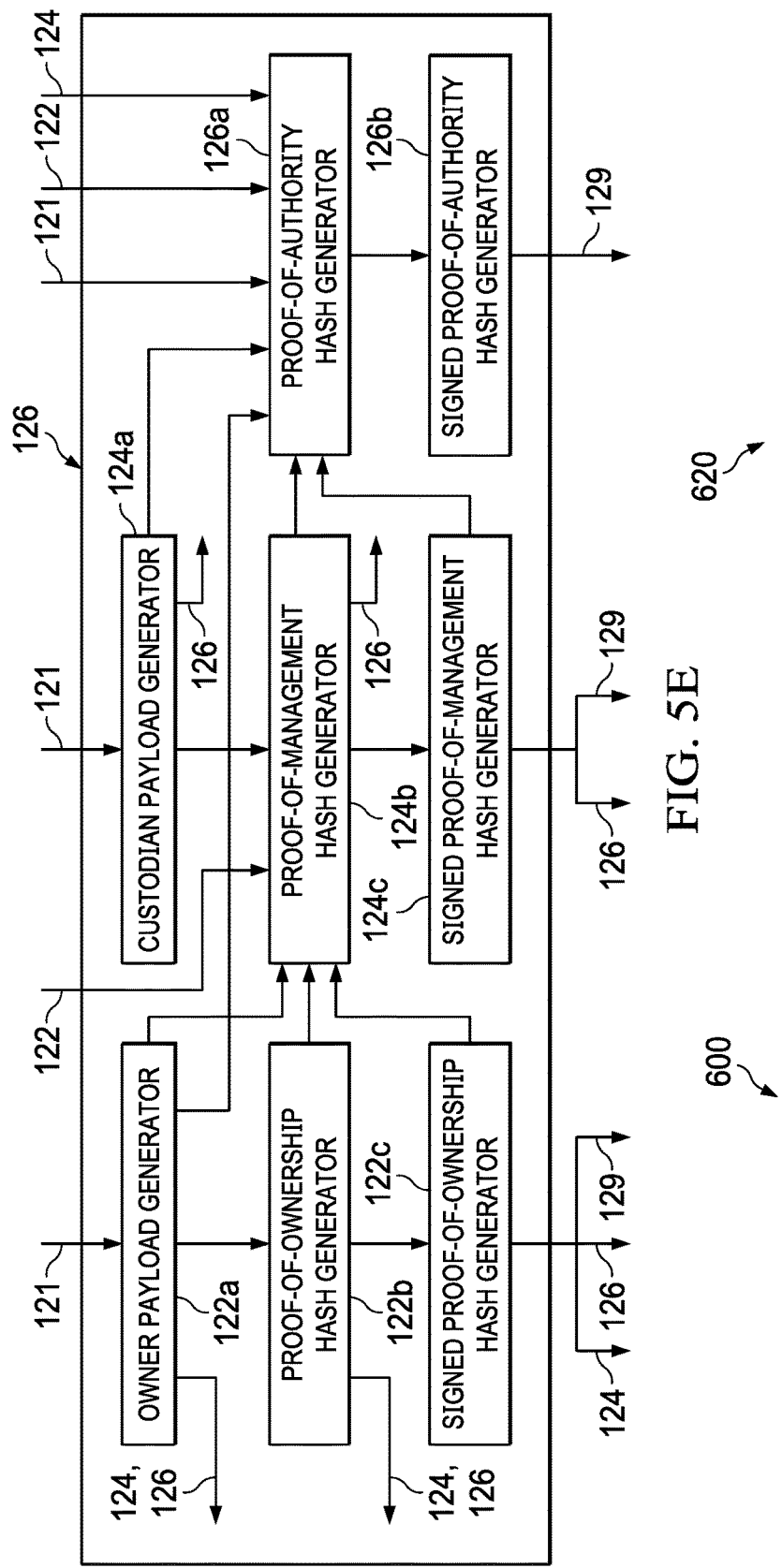
FIG. 5E
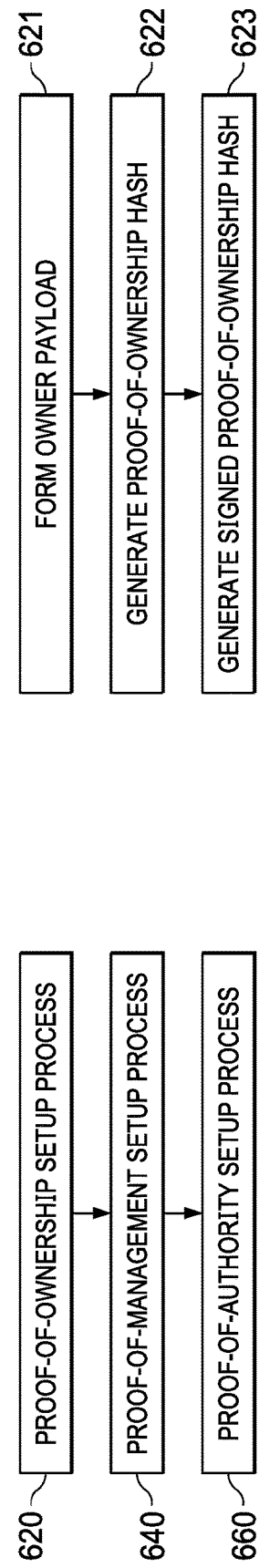
FIG. 6B
FIG. 6A

```
{
  "ownerPayload": {
    "publicAddress": "MFkwEwYHKoZIzj0CAQYIKoZIzj0DAQcDQgAECqF1zy0USFrikJbrNRO3ouKO
XPxq8wMKbNbH3Fukg8tRjHX8AZ3U5IZBiVaWXePopi9uttkmLITQvhmBodCGiw==",
    "publicAddressFormat": "EC#secp256r1",
    "cn": "SCB",
    "ou": "SC VENTURES",
    "org": "STANDARD CHARTERED BANK",
    "country": "SG",
    "creationTime": 1560836413229
  },
  "hash": "E6b1rZamZoR3MlymGdIXvr3kQzdUT3Z5ogaYF+ZLgqw=",
  "hashAlgo": "SHA-256",
  "signature": "MEYCIQCeYGm81dYn4I7h8c1y/zrW1RypWE1hXbETaz6XWu4lOwIhAOAczqnS7I
AbnM6Vg4mF+OqL3+XBvDbuONNYttHhAk9c",
  "signatureAlgo": "SHA256withECDSA"
}
```

FIG. 7A

```
{
  "poo": {
    "ownerInfo": {
      "publicAddress": "MFkwEwYHKoZIzj0CAQYIKoZIzj0DAQcDQgAEhC2/AsS0rDEqr24WFvr3PAm86
      Xr0f0qI1Zb14aVPhFO4CsBE8eCI95JZgVSOJ+HmKmfJUpw33Y1ighYmybtHNQ==",
      "publicAddressFormat": "EC#secp256r1",
      "cn": "SCB",
      "ou": "SC VENTURES",
      "org": "STANDARD CHARTERED BANK",
      "country": "SG",
      "creationTime": 1560837256374
    },
    "hash": "qnSNS0eUhUTrAwVPasPRHEUJwS5khBoizg6tde/lUlU=",
    "hashAlgo": "SHA-256",
    "signature": "MEUCIEU9WIjIBIZ/+7LQ7UgbgGCm1zoIsl/9m/oZwNaACMepAiEAjqF7sJ/
    H8AjgU9dLCIXQxVxcS3EWKzrtmFJn3jpTpF4=",
    "signatureAlgo": "SHA256withECDSA"
  },
  "hash": "N/vQ9SwunTeJV19I38ETAUI1x3K2yE2NFFs7fD5Zd2k=",
  "hashAlgo": "SHA-256",
  "signature": "MEQCIEOu0eWeQ9033LvyqH7j/2EQuzGAKvvTQWFwMPVSLgWkAiBjppfbIesKtb
  GeTdVxuNhCl9BnxbxQKl+92gfyY9qCTw==",
  "signatureAlgo": "SHA256withECDSA"
}
```

FIG. 7B

```
{
  "pom": {
    "poo": {
      "ownerInfo": {
        "publicAddress": "MFkwEwYHKoZIzj0CAQYIKoZIzj0DAQcDQgAE5rBFHLFw5jPTu66/
oNWdBOtzn3j7Ijco8DD1OsquVNlpGVrpLfCKXg86kREn7h31ra7O77IUch0cBKmJYzdEsQ==",
        "publicAddressFormat": "EC#secp256r1",
        "cn": "SCB",
        "ou": "SC VENTURES",
        "org": "STANDARD CHARTERED BANK",
        "country": "SG",
        "creationTime": 1562733596155
      },
      "hash": "JwNIzDgRELo38EhDpWRmftvnzchVSvPGY01t0LviCjM=",
      "hashAlgo": "SHA-256",
      "signature": "MEQCIDOG5vY8ZI/Y0sx26E5+00VBM2hpH86shB+6kkorn6vNAiAeh
6B9jdGOXpNKrX8wLn5WiyQsSKtb890YoK0yF0lVnA==",
      "signatureAlgo": "SHA256withECDSA"
    },
    "hash": "7sXZtaI1n2v9MfS7mQ53r7RP+ORYHnnUXIWNMxCS4Rw=",
    "hashAlgo": "SHA-256",
    "signature": "MEYCIQCvC8AMSwesvKtA/vADrBd8ix3QYN3XHG1cVZhkdti6MwIhAJ9+
MZoshOj0Zt2uBb+M9ZAUGH0BY/hBAo2zAh0aV3RX",
    "signatureAlgo": "SHA256withECDSA"
  },
  "hash": "jbAe0yuxqZcP7EMNjdXbq8PSJqKcZSH8A8e3xsD718I=",
  "hashAlgo": "SHA-256",
  "signature": "MEYCIQCmlIT4coa+4/0+u2iEpu7TV1EFKMIOtOel0/lvKzTXLQIhAKESNP
163qrYlUu2b0wFiEgXcb4wOU+uqR7Vb8gbtYOL",
  "signatureAlgo": "SHA256withECDSA"
}
```

METHODS, SYSTEMS, AND DEVICES FOR MANAGING DIGITAL ASSETS

TECHNICAL FIELD

The present disclosure relates generally to managing digital assets, and more specifically, to methods, systems, devices, and logic for managing digital assets, including performing proof of ownership of digital assets, proof of management of digital assets, proof of authority of digital assets, verification of ownership of digital assets, verification of management by a custodian of digital assets, and verification that an owner of digital assets have authorized a custodian to be an authorized custodian of the digital asset.

BACKGROUND

Presently, there are various forms of digital assets in existence. For example, well known and widely used and held digital assets include, but are not limited to, cryptocurrencies and digital tokens such as Bitcoin, Ethereum, XRP by Ripple, Bitcoin Cash, Litecoin, Stellar Lumens, EOS, Ethereum Classic, Tether, etc. Such digital assets will generally have a public key (and/or public address for the public key) and a corresponding private key. As well known in the art and in asymmetric encryption generally, private keys and public keys have an inherent mathematical relationship such that a public key can be readily derivable from a private key, but it is generally very difficult to derive a private key from a public key.

BRIEF SUMMARY

It is recognized in the present disclosure that conventional approaches to storing and managing public keys and/or private keys inherently suffer from problems. For example, in storing and managing an association of a public and/or private key (and/or a corresponding public address for the public key) along with an owner identifier (e.g., email address), such record suffers from the possibility of being hacked and/or altered. In situations where such records are hacked and altered, ownership of the corresponding digital assets for the public and/or private key (and/or corresponding public address for the public key) can be manipulated. Present example embodiments relate generally to and/or comprise systems, subsystems, processors, devices, logic, methods, and processes for addressing conventional problems, including those described above and in the present disclosure, and more specifically, example embodiments relate to systems, subsystems, processors, devices, logic, methods, and processes for performing management, processing, proof (e.g., proof of ownership, proof of management, and/or proof of authority), and/or verification of digital assets.

In an exemplary embodiment, a method for managing digital assets is described. The method may include forming a first payload (or the owner payload). The first payload may include the public key of the digital asset or a corresponding public address for the public key of the digital asset. The method may also include performing a proof of ownership setup process for an owner of the digital asset. The proof of ownership setup process may include generating a proof of ownership hash. The proof of ownership hash may be generated by hashing at least the first payload. The method may also include signing, using the private key of the digital asset, the proof of ownership hash to arrive at a signed proof of ownership hash.

In another exemplary embodiment, a method for managing digital assets is described. The method includes identifying a first payload. The first payload may include a public key of the digital asset or a corresponding public address for the public key of the digital asset. The method also includes identifying a second payload. The second payload includes a public key of an authorized custodian of the digital asset or a corresponding public address for the public key of the authorized custodian of the digital asset. The second payload also includes a custodian identifier. The custodian identifier is a unique identifier for use in identifying the authorized custodian of the digital asset. The method also includes identifying or generating a proof of ownership hash for the digital asset and/or a signed proof of ownership hash for the digital asset. The method also includes performing a proof of management setup process for the custodian of the digital asset. The proof of management setup process includes generating a proof of management hash. The proof of management hash is generated by hashing at least one or more of the following: the first payload; the second payload; the proof of ownership hash; and/or the signed proof of ownership hash. The proof of management setup process also includes signing, by the authorized custodian of the digital asset, the proof of management hash to arrive at a signed proof of management hash.

In another exemplary embodiment, a method for managing digital assets is described. The method includes identifying a first payload. The first payload includes the public key of the digital asset or a corresponding public address for the public key of the digital asset. The method also includes identifying a second payload. The second payload includes a public key of an authorized custodian of the digital asset or a corresponding public address for the public key of the authorized custodian of the digital asset. Alternatively or in addition, the second payload includes a custodian identifier. The custodian identifier is a unique identifier for use in identifying the authorized custodian of the digital asset. The method also includes identifying a proof of ownership hash for the digital asset and/or a signed proof of ownership hash for the digital asset. The method also includes identifying a proof of management hash for the digital asset and/or a signed proof of management hash for the digital asset. The method also includes performing a proof of authority setup process. The proof of authority setup process includes generating a proof of authority hash. The proof of authority hash is generated by hashing one of the following: at least the first payload and the second payload; at least the proof of management hash; or at least the signed proof of management hash. The proof of authority setup process also includes signing, by an owner of the digital asset, the proof of authority hash to arrive at a signed proof of authority hash.

In another exemplary embodiment, a method for managing digital assets is described. The method includes forming a first payload. The first payload includes the public key of the digital asset or a corresponding public address for the public key of the digital asset. The method also includes forming a second payload. The second payload includes a public key of an authorized custodian of the digital asset and/or a corresponding public address for the public key of the authorized custodian of the digital asset. Alternatively or in addition, the second payload includes a custodian identifier. The custodian identifier is a unique identifier for use in identifying the authorized custodian of the digital asset. The method also includes performing a proof of ownership setup process for an owner of the digital asset. The proof of ownership setup process includes generating a proof of ownership hash. The proof of ownership hash is generated by hashing at least the first payload. The proof of ownership setup process also includes signing, using the private key of the digital asset, the proof of ownership hash to arrive at a signed proof of ownership hash. The method also includes performing a proof of management setup process for the authorized custodian of the digital asset. The proof of management setup process includes generating a proof of management hash. The proof of management hash is generated by hashing at least one or more of the following: the first payload; the second payload; the proof of ownership hash; and/or the signed proof of ownership hash. The proof of management setup process also includes signing, by the authorized custodian of the digital asset, the proof of management hash to arrive at a signed proof of management hash. The method also includes performing a proof of authority setup process. The proof of authority setup process includes generating a proof of authority hash. The proof of authority hash is generated by hashing one of the following: at least the first payload and the second payload; at least the proof of management hash; or at least the signed proof of management hash. The proof of authority setup process also includes signing, by the owner of the digital asset, the proof of authority hash to arrive at a signed proof of authority hash.

In yet another exemplary embodiment, a method for managing digital assets is described. The method includes forming a first payload. The first payload includes the public component of the digital asset. The first payload also includes an owner identifier. The owner identifier is a unique identifier for use in identifying the owner of the digital asset. The method also includes performing a proof of ownership setup process for the owner of the digital asset. The proof of ownership setup process includes generating a proof of ownership result. The proof of ownership result is generated by performing a cryptographic primitive on at least the first payload. The proof of ownership setup process also includes signing, using the private key of the digital asset, the proof of ownership result to arrive at a signed proof of ownership result.

BRIEF DESCRIPTION OF THE DRAWINGS

For a more complete understanding of the present disclosure, example embodiments, and their advantages, reference is now made to the following description taken in conjunction with the accompanying drawings, in which like reference numbers indicate like features, and:

FIG. 1 is an illustration of an example of a conventional system;

FIG. 2 is an illustration of an example record database for storing associations between a user and a public and/or private key of the digital asset owned by the user;

FIG. 3 is an illustration of an example embodiment of a system for managing digital assets;

FIG. 5E is an illustration of another example embodiment of a proof of authority processor;

FIG. 6A is an illustration of an example embodiment of a method of managing digital assets;

FIG. 6B is an illustration of an example embodiment of a proof of ownership process or proof of ownership setup process;

FIG. 7A is an illustration of an example embodiment of a proof of ownership in JSON;

FIG. 7B is an illustration of an example embodiment of a proof of management in JSON; and FIG. 7C is an illustration of an example embodiment of a proof of authority in JSON.

Although similar reference numbers may be used to refer to similar elements in the figures for convenience, it can be appreciated that each of the various example embodiments may be considered to be distinct variations.

Figure 4A:
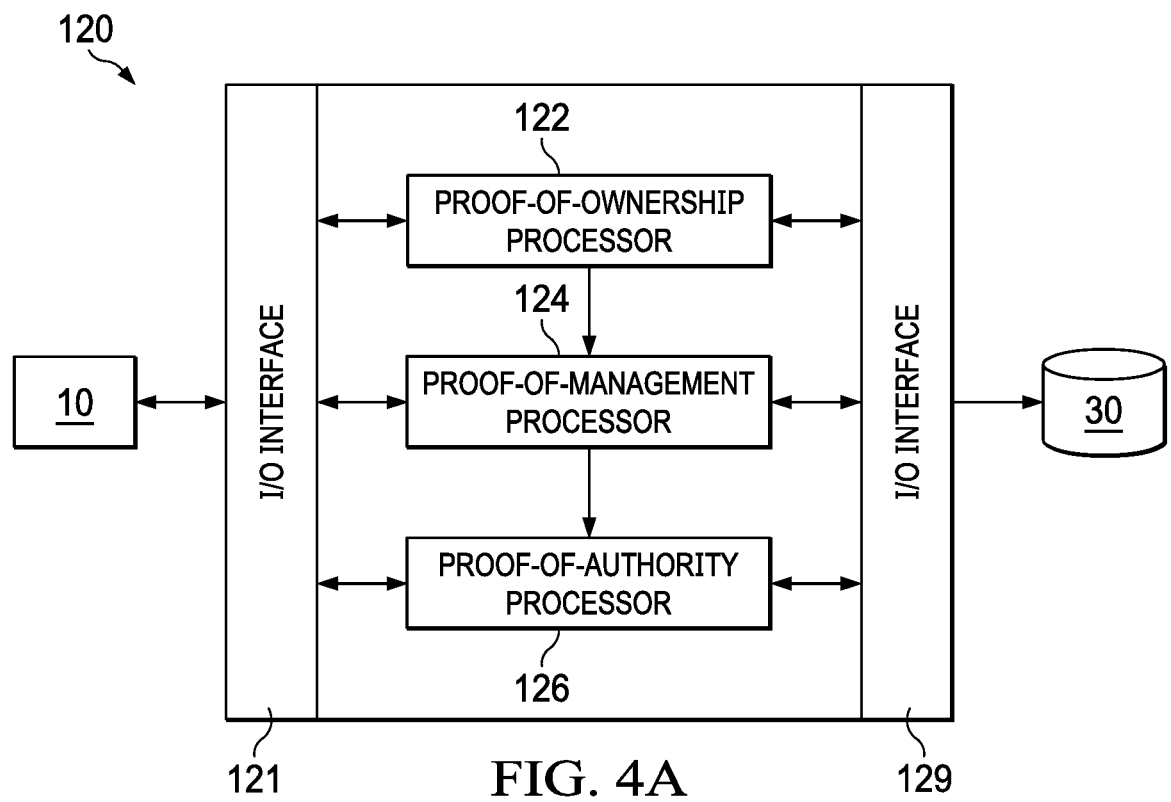
FIG. 4A is an illustration of an example embodiment of a processor for managing digital assets.

Example embodiments will now be described with reference to the accompanying drawings, which form a part of the present disclosure and which illustrate example embodiments which may be practiced. As used in the present disclosure and the appended claims, the terms "embodiment," "example embodiment," "exemplary embodiment," and "present embodiment" do not necessarily refer to a single embodiment, although they may, and various example embodiments may be readily combined and/or interchanged without departing from the scope or spirit of example embodiments. Furthermore, the terminology as used in the present disclosure and the appended claims is for the purpose of describing example embodiments only and is not intended to be limitations. In this respect, as used in the present disclosure and the appended claims, the term "in" may include "in" and "on," and the terms "a," "an," and "the" may include singular and plural references. Furthermore, as used in the present disclosure and the appended claims, the term "by" may also mean "from," depending on the context. Furthermore, as used in the present disclosure and the appended claims, the term "if" may also mean "when" or "upon," depending on the context. Furthermore, as used in the present disclosure and the appended claims, the words "and/or" may refer to and encompass any and all possible combinations of one or more of the associated listed items.

DETAILED DESCRIPTION

There are various forms of digital assets in existence, including well known and widely used/held digital assets such as Bitcoin, Ethereum, Hedera HBar, XRP by Ripple, Bitcoin Cash, Litecoin, Stellar Lumens, EOS, Ethereum Classic, Tether, smart contracts, etc. As known in the art, such digital assets will have a public key (and/or public address for the public key) and a corresponding private key. As well known in the art, private keys and public keys have an inherent mathematical relationship such that a public key can be readily derivable from a private key, but it is generally very difficult to derive a private key from a public key.

When it comes to digital assets, a digital asset can only be transacted (e.g., transfer of the digital asset to another person, use of the digital asset to pay for a product or service, etc.) by a person who has the private key of the digital asset. Put differently, whoever controls the private key of a digital asset will have control of the digital asset.

Due to the inherent nature of private keys (i.e., long strings of characters), an owner of a digital asset will generally not memorize the private key of the digital asset in the same way that a login password would be memorized. Instead, the owner of the digital asset will store the private keys in an electronic wallet, a data table or note taking program/application, and/or cold storage (e.g., offline on a printed paper). Alternatively or in addition, there are various companies, including financial institutions, that offer custodian services of digital assets, including the storing of private keys for owners of digital assets. For example, as illustrated in FIG. 1, when a custodian 10 creates and/or stores public and private key pairs for a digital asset in a secure environment (e.g., software and/or hardware security module, or "HSM") 20 for a customer/user/owner 2 (hereinafter "customer" or "owner" or "user"), the custodian 10 will be required to associate the public and/or private keys for the digital asset (and/or a corresponding public address for the public key) to the owner 2. Furthermore, the custodian 10 will need to be able to prove that the public and/or private keys (and/or a corresponding public address for the public key) belong to such owner 2.

Presently, such custodians 10 will record the public and/or private keys (and/or a corresponding public address for the public key) with an identifier that identifies the owner 2, and such records are recorded in data tables or other form of record database. For example, as illustrated in FIG. 2, a record database 15 may include a customer identifier column 15a and a corresponding public address column 15b. The record database 15 may be stored in a computer 14, data storage or database management system 12, the cloud (or cloud computing or internet) 16, etc. As illustrated in FIG. 2, the customer identifier may be or include the customer's email address and/or full legal name. Alternatively or in addition, the customer identifier may be or include identification numbers such as passport numbers, drivers license numbers, citizenship card numbers, etc. It is recognized in the present disclosure, however, that this approach inherently suffers from problems. For example, in storing an association of a public and/or private key (and/or a corresponding public address for the public key) along with an owner identifier (e.g., email address) 15 using conventional methods (e.g., computer 14, database 12, cloud 16, etc.), such record suffers from the possibility of being hacked and/or altered. In a situation where such records are hacked and altered, ownership of the corresponding digital assets for the public and/or private key (and/or corresponding public address for the public key) can be readily changed as a result.

Present example embodiments relate generally to and/or include systems, subsystems, processors, devices, logic, methods, and processes for addressing conventional problems, including those described above and in the present disclosure, and more specifically, example embodiments relate to systems, subsystems, processors, devices, logic, methods, and processes for managing digital assets, including performing proof of ownership, management, and authority of digital assets, and/or verification of ownership, management, and authority of digital assets such as cryptocurrencies, digital tokens, and the like. As used in the present disclosure, the term "digital asset" may include, but is not limited to, cryptocurrencies, digital tokens, security-backed tokens, unsecured tokens, stablecoins, altcoins, public key and private key pairs, smart contracts, RSA, and the like. Furthermore, the term "hashing", or the like, is a term known in the art and, where applicable, may broadly and equivalently refer to a transformation or mapping of an input into a fixed-length string or series of characters (e.g., by using a hashing algorithm, hashing function, or the like). Similarly, the term "hash" may, where applicable, broadly refer to a fixed-length string or series of characters resulting from hashing an input (e.g., by using a hashing algorithm, hashing function, or the like. As known in the art, it is impossible to derive an original input from its hash. Furthermore, the terms "encrypting", "encryption", and "encrypt" are terms known in the art and, where applicable, may broadly and equivalently refer to a conversion of an input into a series of characters (or encrypted input) in such a way that the input can be readily recovered from the encrypted input (e.g., if an appropriate key is applied to decrypt the encrypted input). Furthermore, the terms "digitally signing", "digital signing", "digitally sign", "signing", "sign", and the like, are terms known in the art for creating digital signatures and, where applicable, may broadly and equivalently refer to encrypting an input using a private key (i.e., for digital signatures, which is unlike the general approach of encrypting a message using a public key) so as to create a digital signature in such a manner that a recipient can, by applying a corresponding public key (i.e., a public key that corresponds to the private key used to create the digital signature; for digital signatures, the public key is used to decrypt the digital signature, which is unlike the general approach of decrypting a message using a private key), validate that the digital signature was signed (or encrypted) by the private key. It is to be understood in the present disclosure that one or more elements and/or aspects of example embodiments may include and/or be implement, in part or in whole, solely and/or in cooperation with other elements, using networking technologies, cloud computing, and/or one or more forms of distributed ledger technology (DLT) (e.g., blockchain). Example embodiments will now be described below with reference to the accompanying figures, which form a part of the present disclosure.

Example Embodiments of a System for Managing Digital Assets (e.g., System 100).

As an overview, an example embodiment of a system (e.g., system 100) for managing digital assets is illustrated in FIG. 3. The system 100 may be configurable or configured to perform one or more of a plurality of functions, operations, actions, methods, and/or processes, including those described in the present disclosure. As a non-limiting example, the system 100 may be configurable or configured to manage and/or process one or a plurality of different types/forms of digital assets owned by a plurality of users 102.

The system 100 may include and/or communicate with a plurality of users 102. One or more of the users 102 may be owners of digital assets managed by the system 100. The system 100 may also include and/or communicate with one or more custodians 110. Each custodian 110 may provide, among other things, custodian services of digital assets, including the storing of private keys for owners of digital assets. The system 100 may include one or more processors (e.g., processor 120), or the like. For example, the processor 120 may be a software and/or hardware security module (collectively or individually referred to as "HSM") 120. As another example, the processor may include an HSM. The processor 120 may be controllable and/or accessible by one or more custodians 110. The processor 120 may be configurable or configured to connect to a database 130 (e.g., distributed ledger 130, blockchain 130, database 130, etc.), network, database, or the like. For example, when the digital asset is Bitcoin, the processor 120 may be configurable or configured to communicate with a Bitcoin blockchain 130. Alternatively or in addition, when the processor 120 performs a proof of ownership setup process for a digital asset (owned by a user) (which may include generating a proof of ownership hash and/or signed proof of ownership hash for the digital asset, as further described in the present disclosure), the signed proof of ownership hash for the digital asset and the public key for the digital asset (and in some embodiments, the proof of ownership hash for the user) may be stored and/or made available (e.g., publicly available) in or on the database 130. Alternatively or in addition, when the processor 120 performs a proof of ownership setup process for a custodian (i.e., custodian of a digital asset owned by the user) (which may include generating a proof of ownership hash and/or signed proof of ownership hash for the custodian, as further described in the present disclosure), the signed proof of ownership hash for the custodian and the public key for the custodian (and in some embodiments, the proof of ownership hash for the custodian) may be stored and/or made available (e.g., publicly available) in or on the database 130. Alternatively or in addition, when the processor 120 performs a proof of management setup process (which may include generating a proof of management hash and/or signed proof of management hash, as further described in the present disclosure), the signed proof of management hash and the public key for the custodian (and in some embodiments, the proof of management hash) may be stored and/or made available (e.g., publicly available) in or on the database 130. Alternatively or in addition, when the processor 120 performs a proof of authority setup process (which may include generating a proof of authority hash and/or signed proof of authority hash, as further described in the present disclosure), the signed proof of management hash and the public key for the user or digital asset (and in some embodiments, the proof of authority hash) may be stored and/or made available (e.g., publicly available) in or on the database 130. Although the figures may illustrate the system 100 having one processor 120, it is to be understood that the system 100 may include more than one processor 120 without departing from the teachings of the present disclosure.

As used in the present disclosure, when applicable, a reference to a system or processor may also refer to, apply to, and/or include a computing device, processor, server, system, cloud-based computing, or the like, and/or functionality of a processor, computing device, server, system, cloud-based computing, or the like. The system 100 and/or processor 120 (and/or its elements, as described in the present disclosure) may be any processor, server, system, device, computing device, controller, microprocessor, microcontroller, microchip, semiconductor device, or the like, configurable or configured to perform, among other things, a processing and/or managing of information, data communications, hashing of information, encryption and decryption of information, creating digital signatures, and/or other actions described above and in the present disclosure. Alternatively or in addition, the system 100 and/or processor 120 (and/or its elements, as described in the present disclosure) may include and/or be a part of a virtual machine, software, processor, computer, node, instance, host, or machine, including those in a networked computing environment. As used in the present disclosure, a network and/or cloud may be a collection of devices connected by communication channels that facilitate communications between devices and allow for devices to share resources. Such resources may encompass any types of resources for running instances including hardware (such as servers, clients, mainframe computers, networks, network storage, data sources, memory, central processing unit time, scientific instruments, and other computing devices), as well as software, software licenses, available network services, and other non-hardware resources, or a combination thereof. A network or cloud may include, but is not limited to, computing grid systems, peer to peer systems, mesh-type systems, distributed computing environments, cloud computing environment, etc. Such network or cloud may include hardware and software infrastructures configured to form a virtual organization comprised of multiple resources which may be in geographically disperse locations. Network may also refer to a communication medium between processes on the same device. Also as referred to herein, a network element, node, or server may be a device deployed to execute a program operating as a socket listener and may include software instances.

These and other elements of the system 100 will now be further described with reference to the accompanying drawings.

The Processor (e.g., Processor 120).

FIGS. 4A-D illustrate example embodiments of the processor (e.g., processor 120). The processor 120 may be configurable or configured to manage digital assets, including, but not limited to, performing a proof of ownership (also referred to herein as "PoO" or "proof-of-ownership") of digital assets (including a proof of ownership setup process), performing a proof of management (also referred to herein as "PoM" or "proof-of-management") of digital assets (including a proof of management setup process), performing a proof of authority (also referred to herein as "PoA" or "proof-of-authority") of digital assets (including a proof of authority setup process), performing a verification of proof of ownership of digital assets, performing a verification of proof of management of digital assets, and/or performing a verification of proof of authority of digital assets.

Example embodiments of the processor 120 may include one or more I/O interfaces (e.g., I/O interface 121), or the like. The I/O interface 121 may be configurable or configured to communicate with the custodian 110 (and/or a computing device of the custodian 110). For example, the I/O interface 121 may be configurable or configured to receive payloads (e.g., owner or first payloads, custodian or second payloads, etc.) and/or information for use in forming payloads from the custodian 110. The processor 120 may also include one or more database interfaces (e.g., database interface 129), or the like. The database interface 129 may be configurable or configured to communicate with database 130 and/or another database (not shown). For example, when the database 130 is a blockchain 130, the database interface 129 may be a blockchain interface 129.

As will be further described in the present disclosure, the processor 120 may include one or more proof of ownership processors (e.g., proof of ownership processor 122). Alternatively or in addition, the processor 120 may be configurable or configured to perform one or more functions or actions of one or more proof of ownership processors 122. Alternatively or in addition, the processor 120 may include one or more proof of management processors (e.g., proof of management processor 124). Alternatively or in addition, the processor 120 may be configurable or configured to perform one or more functions or actions of one or more proof of management processors 124. Alternatively or in addition, the processor 120 may include one or more proof of authority processors (e.g., proof of authority processor 126). Alternatively or in addition, the processor 120 may be configurable or configured to perform one or more functions or actions of one or more proof of authority processors 126. Although FIGS. 4A-D may illustrate one proof of ownership processor 122, one proof of management processor 124, and one proof of authority processor 126, it is to be understood that the processor 120 may include more or less than one proof of ownership processor 122, more or less than one proof of management processor 124, and/or more or less than one proof of authority processor 126 without departing from the teachings of the present disclosure.

As illustrated in FIG. 4A, an example embodiment of the processor 120 may include a proof of ownership processor 122, a proof of management processor 124, and a proof of authority processor 126. The proof of ownership processor 122 may be separate from the proof of management processor 124 and the proof of authority processor 126. The proof of ownership processor 122 may be configurable or configured to communicate with the proof of management processor 124. The proof of ownership processor 122 may also be configurable or configured to communicate with the I/O interface 121 and/or the database interface 129. The proof of management processor 124 may be separate from the proof of authority processor 126. The proof of management processor 124 may be configurable or configured to communicate with the proof of authority processor 126. The proof of management processor 124 may also be configurable or configured to communicate with the I/O interface 121 and/or the database interface 129. The proof of authority processor 126 may be configurable or configured to communicate with the I/O interface and/or the database interface 129.

Figure 4B:
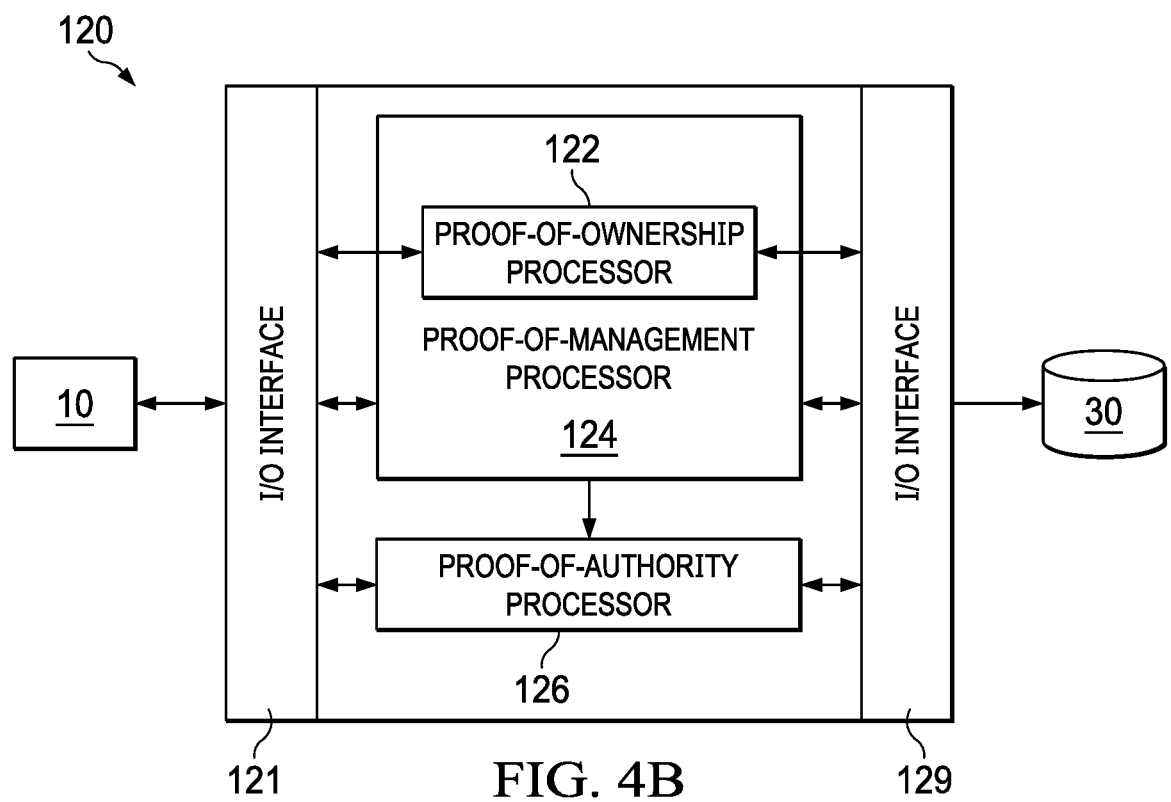
FIG. 4B is an illustration of another example embodiment of a processor for managing digital assets.

As illustrated in FIG. 4B, an example embodiment of the processor 120 may include a proof of management processor 124 and a proof of authority processor 126. The proof of management processor 124 may include one or more proof of ownership processors 122. Alternatively or in addition, the proof of management processor 124 may be configurable or configured to perform one or more functions or actions of one or more proof of ownership processors 122. When the proof of ownership processor 122 is included in the proof of management processor 124, the proof of ownership processor 122 may be configurable or configured to communicate with other parts of the proof of management processor 124, the I/O interface 121, and/or the database interface 129. The proof of management processor 124 may be separate from the proof of authority processor 126. The proof of management processor 124 may be configurable or configured to communicate with the proof of authority processor 126. The proof of authority processor 126 may be configurable or configured to communicate with the I/O interface and/or the database interface 129.

Figure 4C:
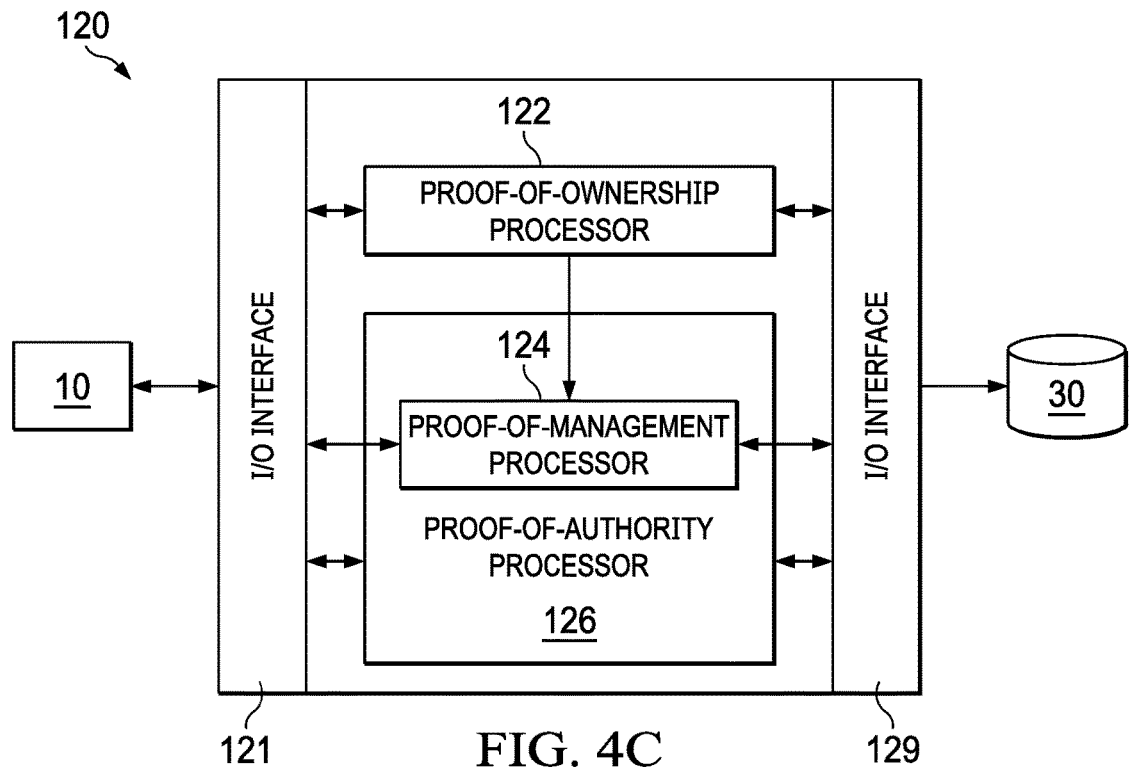
FIG. 4C is an illustration of another example embodiment of a processor for managing digital assets.

As illustrated in FIG. 4C, an example embodiment of the processor 120 may include a proof of ownership processor 122 and a proof of authority processor 126. The proof of ownership processor 122 may be separate from the proof of authority processor 126. The proof of authority processor 126 may include one or more proof of management processors 124. Alternatively or in addition, the proof of authority processor 126 may be configurable or configured to perform one or more functions or actions of one or more proof of management processors 124. When the proof of management processor 124 is included in the proof of authority processor 126, the proof of management processor 124 may be configurable or configured to communicate with other parts of the proof of authority processor 126, the I/O interface 121, and/or the database interface 129. The proof of ownership processor 122 may be configurable or configured to communicate with the proof of management processor 124 (e.g., when the proof of management processor 124 is included in the proof of authority processor 126) and/or proof of authority processor 126 (e.g., when the proof of authority processor 126 performs the functions of the proof of management processor 124). The proof of ownership processor 122 may also be configurable or configured to communicate with the I/O interface 121 and/or the database interface 129. The proof of authority processor 126 may be configurable or configured to communicate with the I/O interface and/or the database interface 129.

Figure 4D:
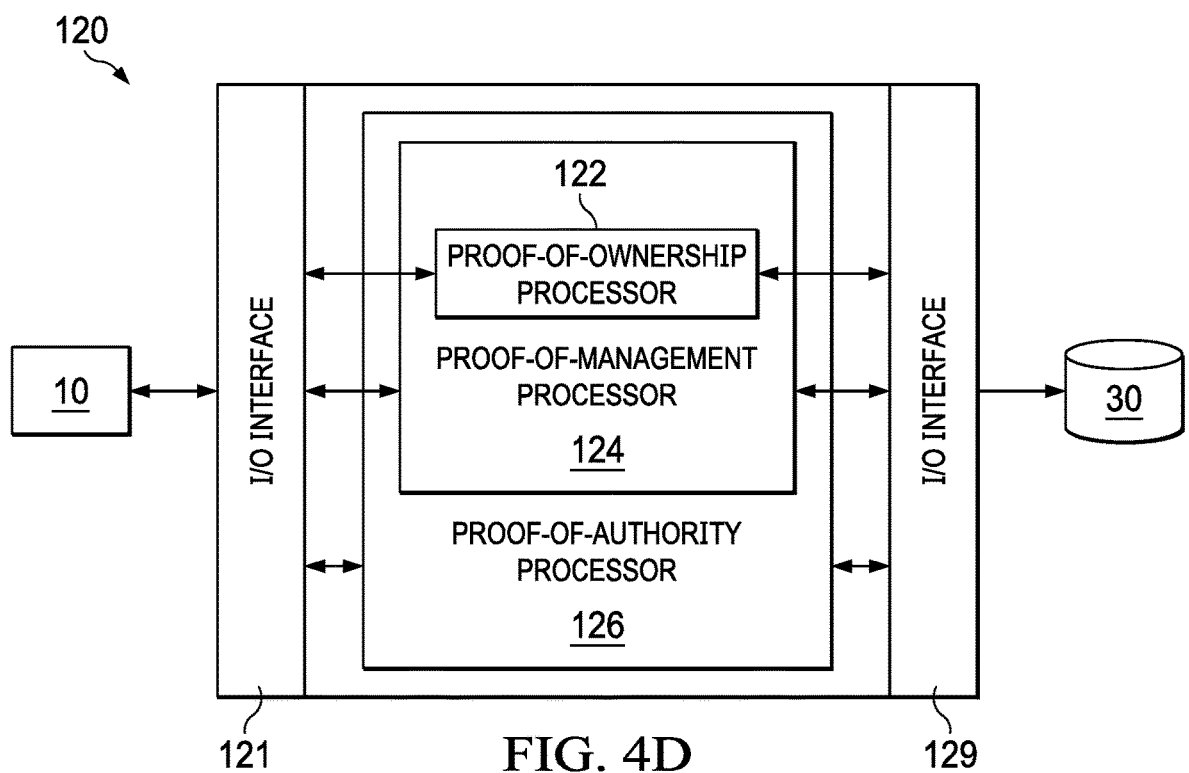
FIG. 4D is an illustration of another example embodiment of a processor for managing digital assets.

As illustrated in FIG. 4D, an example embodiment of the processor 120 may include a proof of authority processor 126. The proof of authority processor 126 may include one or more proof of ownership processors 122 and one or more proof of management processors 124. Alternatively or in addition, the proof of authority processor 126 may be configurable or configured to perform one or more functions or actions of one or more proof of ownership processors 122 and one or more functions or actions of one or more proof of management processors 124. When the proof of ownership processor 122 and the proof of management processor 124 are included in the proof of authority processor 126, the proof of ownership processor 122 may be configurable or configured to communicate with the proof of management processor 124, other parts of the proof of authority processor 126, the I/O interface 121, and/or the database interface 129. Furthermore, the proof of management processor 124 may be configurable or configured to communicate with other parts of the proof of authority processor 126, the I/O interface 121, and/or the database interface 129.

These elements of the processor 120 will now be further described with reference to the accompanying drawings.

The Proof of Ownership Processor (e.g., Proof of Ownership Processor 122).

Figure 5A:
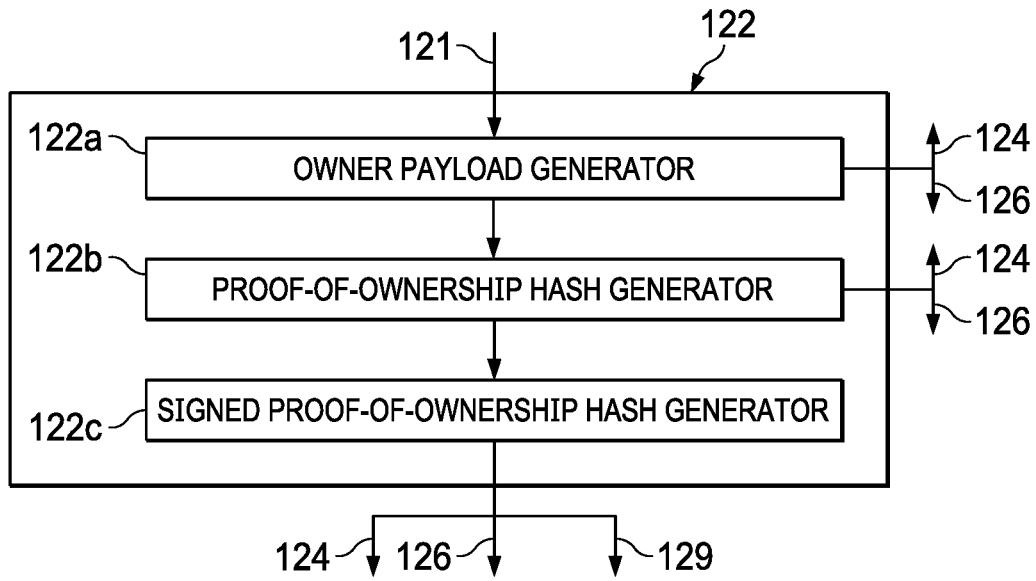
FIG. 5A is an illustration of an example embodiment of a proof of ownership processor.

FIG. 5A illustrates an example embodiment of a proof of ownership processor (e.g., proof of ownership processor 122). The proof of ownership processor 122 may be configurable or configured to perform a proof of ownership process (e.g., proof of ownership process 620, as described in the present disclosure), including performing a proof of ownership setup process (e.g., proof of ownership process 620). In performing the proof of ownership process 620 (or proof of ownership setup process 620) for a digital asset owned by a user, the proof of ownership processor 122 generates or creates a proof of ownership of the digital asset. The proof of ownership of a digital asset can then be used to prove whether or not an entity who claims to be the owner of the digital asset is in fact the owner of the digital asset (e.g., irrespective of whether or not that entity has or knows the private key of the digital asset). As will be further described in the present disclosure, such proof of ownership of a digital asset will include a signed proof of ownership hash (as generated by the signed proof of ownership hash generator 122c). The proof of ownership of a digital asset may also include a proof of ownership hash (as generated by the proof of ownership hash generator 122b). The proof of ownership of a digital asset may also include the public key (or corresponding public address of the public key) of the digital asset.

In example embodiments, the proof of ownership processor 122 may also perform a proof of ownership verification process (e.g., proof of ownership verification process 630, as described in the present disclosure). In performing the proof of ownership verification process 630 for a digital asset, the proof of ownership processor 122 can perform a verification or check as to whether or not an entity (who may be a natural person, company, corporation, organization, etc.) who claims to be the owner of the digital asset is the owner of the digital asset.

It is to be understood in the present disclosure that, in addition to or in replacement of the proof of ownership processor 122, the processor 120 (and/or proof of management processor 124, as illustrated in at least FIG. 4B, and/or proof of authority processor 126, as illustrated in at least FIG. 4D) may also perform one or more functions or actions of the proof of ownership processor 122, including the proof of ownership process 620, the proof of ownership setup process 620, and/or the proof of ownership verification process 630, without departing from the teachings of the present disclosure.

The proof of ownership processor 122 may be configurable or configured to create a proof of ownership for a digital asset. As used in the present disclosure, a "proof of ownership" for a particular digital asset may be a cryptographic proof (or may include a cryptographic proof or may be used to cryptographically prove) that a particular user (or owner) 102 owns the particular digital asset. For example, the proof of ownership for a particular digital asset may be proof (or may include a proof or may be used to prove) that a public key of the particular digital asset and/or a public address of a public key of the particular digital asset (e.g., a crypto address such as a Bitcoin or BTC public address or ETH public address) belongs to a particular user (or owner) 102. In example embodiments, the proof of ownership created by the proof of ownership processor 122 (and/or the processor 120 and/or the proof of management processor 124, as illustrated in FIG. 4B, and/or the proof of authority processor 126, as illustrated in at least FIG. 4D) may be used to prove ownership of a particular digital asset without a need to reveal the private key of the digital asset. As will be further described in the present disclosure, the proof of ownership for a particular digital asset may be in the form of (or may include) a digitally signed hash of an owner payload (also referred to in the present disclosure as the "first payload", which will be further described below). As used in the present disclosure, a digitally signed hash of a given payload refers to a hashing of the payload (using a particular hashing algorithm) to form a hashed payload, followed by a digital signing of the hashed payload (using a particular digital signature algorithm) to form the digitally signed hash of the payload.

As illustrated in FIG. 5A, an example embodiment of the proof of ownership processor 122 may include an owner payload generator (e.g., owner payload generator 122a). Alternatively or in addition, the proof of ownership processor 122 (and/or processor 120 and/or proof of management processor 124, as illustrated in FIG. 4B, and/or proof of authority processor 126, as illustrated in FIG. 4D) may be configurable or configured to perform one or more functions or actions of the owner payload generator 122a. The proof of ownership processor 122 may also include a proof of ownership hash generator (e.g., proof of ownership hash generator 122b). Alternatively or in addition, the proof of ownership processor 122 (and/or processor 120 and/or proof of management processor 124, as illustrated in FIG. 4B, and/or proof of authority processor 126, as illustrated in FIG. 4D) may be configurable or configured to perform one or more functions or actions of the proof of ownership hash generator 122b. The proof of ownership processor 122 may also include a signed proof of ownership hash generator (e.g., signed proof of ownership hash generator 122c). Alternatively or in addition, the proof of ownership processor 122 (and/or processor 120 and/or proof of management processor 124, as illustrated in FIG. 4B, and/or proof of authority processor 126, as illustrated in FIG. 4D) may be configurable or configured to perform one or more functions or actions of the signed proof of ownership hash generator 122c. These elements of the proof of ownership processor 122 will now be further described with reference to the accompanying drawings.

The Owner Payload Generator (e.g., Owner Payload Generator 122a).

An example embodiment of the owner payload generator (e.g., owner payload generator 122a) may be configurable or configured to form an owner payload (or first payload) for a digital asset. In example embodiments, the owner payload includes information pertaining to the owner of a digital asset, including information pertaining to the digital asset itself. For example, the owner payload includes the public key of the digital asset (and/or a corresponding public address for the public key of the digital asset), which is used to identify the digital asset. The owner payload may also include an indication of the format for the public address of the digital asset. FIG. 7A (and FIGS. 7B and 7C) illustrate example representations of a public address of a digital asset and corresponding format for the public address of the digital asset, which are depicted in FIG. 7A as "MFkwEwYHKoZIzj0CAQYIKoZIzj0DAQcDQgAECq F1zy0USFrikJbrNRO3ouKOXPxq8wMKb NbH3Fukg8tRjHX8AZ3U5IZBiVaWXePopi9uttkmL1TQ vhmBodCGiw==" and "EC#secp256r1", respectively. In example embodiments, the owner payload may also include a unique identifier, or the like, that can be used to uniquely, specifically, or unmistakably identify the owner 102 of the digital asset. For example, the unique identifier may be a legal entity identifier (LEI) of the owner 102. In some example embodiments, the owner payload may also include other information including, but not limited to, a legal name of the owner (e.g., company name (cn) and organizational unit (ou) if the owner is a company with multiple organizational units); location of the owner (e.g., city, state, province, and/or country); a date and/or time stamp (e.g., creation time of the digital asset and/or payload); etc. The owner payload may also include a format of the public address (e.g., when the owner payload includes the public address for the public key of the digital asset), an identification of a hashing algorithm used to generate the proof of ownership hash (as further described in the present disclosure), and/or an identification of the signature algorithm used to generate the signed proof of ownership hash (as further described in the present disclosure). FIG. 7A illustrates an example representation of an owner payload, as provided within the "ownerPayload" section. While FIG. 7A (and FIG. 7B for the proof of management and FIG. 7C for the proof of authority) illustrates an example of the proof of ownership in JSON, it is to be understood that the proof of ownership (and/or proof of management and/or proof of authority) may be written in any other format without departing from the teachings of the present disclosure.

The owner payload generator 122a may be configurable or configured to receive information to form the owner payload via the I/O interface 121. After the owner payload is formed by the owner payload generator 122a, the owner payload generator 122a may provide the formed owner payload to the proof of ownership hash generator 122b, the proof of management processor 124, the proof of authority processor 126, the I/O interface 121, and/or the database interface 129. For example, the formed owner payload may be provided to the proof of management hash generator 124b of the proof of management processor 124. As another example, the formed owner payload may be provided to the proof of authority hash generator 126b of the proof of authority processor 126.

The Proof of Ownership Hash Generator (e.g., Proof of Ownership hash generator 122b).

An example embodiment of the proof of ownership hash generator (e.g., proof of ownership hash generator 122b) may be configurable or configured to generate a proof of ownership hash for the digital asset. The proof of ownership hash may be generated by hashing at least the owner payload, as formed by the owner payload generator. The hashing algorithm used by the proof of ownership hash generator 122b may be any hashing algorithm including, but not limited to, SHA-256, SHA-3, etc.. FIG. 7A (and FIGS. 7B and 7C) illustrate examples of a proof of ownership hash and hashing algorithm used for the hashing, which are depicted in FIG. 7A as "E6b1rZamZoR3MlymGdIXvr3kQzdUT3Z5ogaYF+ZLgqw=" and "SHA-256", respectively. It is to be understood that any other hashing algorithm may be used to generate the proof of ownership hash without departing from the teachings of the present disclosure.

Figure 5B:
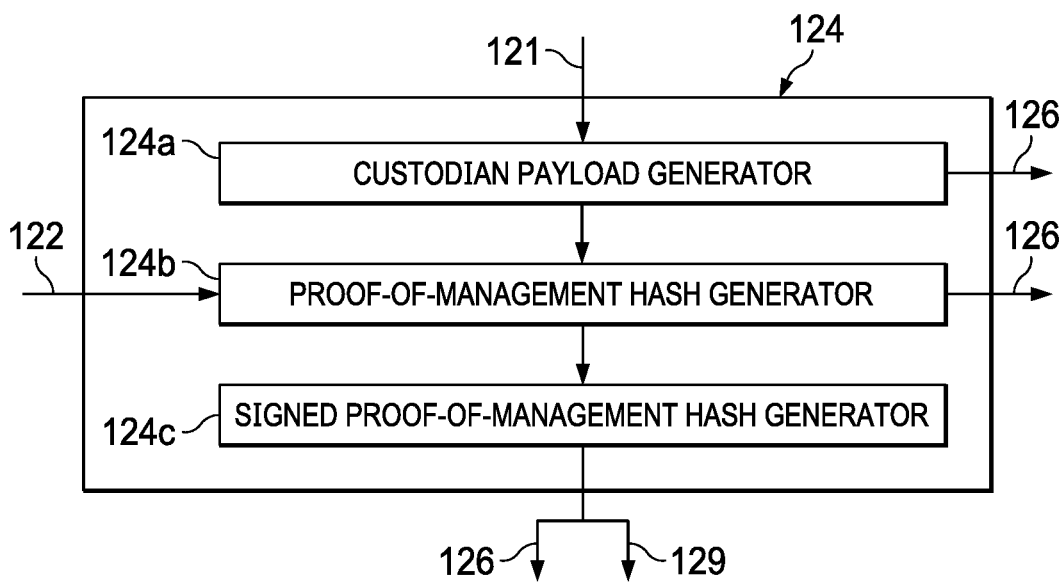
FIG. 5B is an illustration of an example embodiment of a proof of management processor.
Figure 5C:
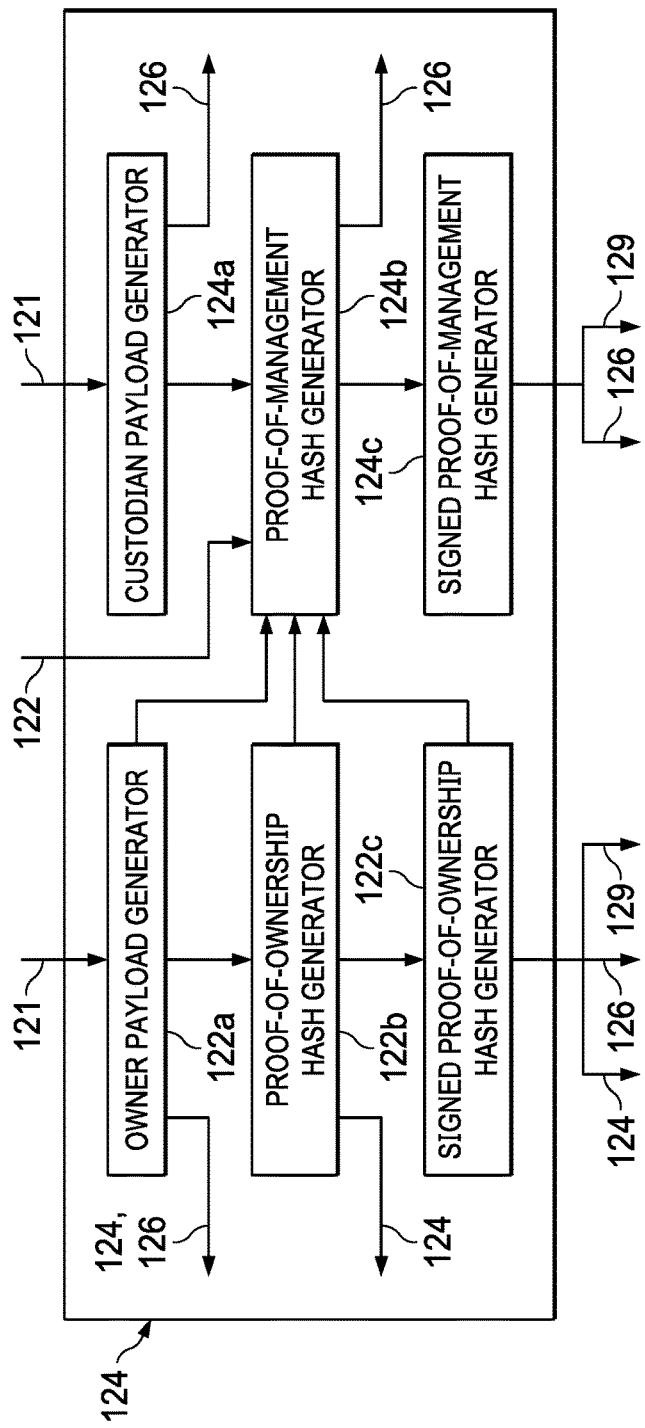
FIG. 5C is an illustration of another example embodiment of a proof of management processor.

The proof of ownership hash generator 122b may be configurable or configured to receive the owner payload from the owner payload generator 122a. After the proof of ownership hash is generated by the proof of ownership hash generator 122b, the proof of ownership hash generator 122b may provide the generated proof of ownership hash to the signed proof of ownership hash generator 122c, the proof of management processor 124, the proof of authority processor 126, the I/O interface 121, and/or the database interface 129. For example, the generated proof of ownership hash may be provided to the proof of management hash generator 124b of the proof of management processor 124 (as illustrated in FIGS. 5A and 5B). As another example, the generated proof of ownership hash may be provided to the proof of management hash generator 124b of the proof of authority processor 126 (as illustrated in FIGS. 5A and 5C).

The Signed Proof of Ownership Hash Generator (e.g., Signed Proof of Ownership Hash Generator 122c).

An example embodiment of the signed proof of ownership hash generator (e.g., signed proof of ownership hash generator 122c) may be configurable or configured to generate a signed proof of ownership hash for the digital asset. The signed proof of ownership hash may be generated by digitally signing the proof of ownership hash, as generated by the proof of ownership hash generator 122b. In an example embodiment, the private key of the digital asset is used to digitally sign the proof of ownership hash so as to generate the signed proof of ownership hash. The digital signature algorithm used by the signed proof of ownership hash generator 122c may be any digital signature algorithm such as SHA-256 with ECDSA. FIG. 7A (and FIGS. 7B and 7C) illustrate examples of a signed proof of ownership hash and digital signature algorithm used for the signing, which are depicted in FIG. 7A as "MEYCIQCeYGm81dYn4I7h8c1y/zrW1RypWE1hXbETaz6XWu41OwIhAOAczqnS7IAbnM6Vg4 mF+OqL3+XBvDbuONNYttHhAk9c" and "SHA-256withECDSA", respectively. It is to be understood that any other digital signature algorithm may be used to generate the signed proof of ownership hash without departing from the teachings of the present disclosure.

The signed proof of ownership hash generator 122c may be configurable or configured to receive the proof of ownership hash from the proof of ownership hash generator 122b. After the signed proof of ownership hash is generated by the signed proof of ownership hash generator 122c, the signed proof of ownership hash generator 122c may provide the signed proof of ownership hash to the proof of management processor 124, the proof of authority processor 126, the 110 interface 121, and/or the database interface 129. For example, the signed proof of ownership hash may be provided to the proof of management hash generator 124b of the proof of management processor 124 (as illustrated in FIGS. 5A and 5B). As another example, the signed proof of ownership hash may be provided to the proof of management hash generator 124b of the proof of authority processor 126 (as illustrated in FIGS. 5A and 5C).

It is to be understood in the present disclosure that example embodiments of the proof of ownership processor 122 may also be configurable or configured to perform a proof of ownership setup process (and/or create a proof of ownership) for a custodian. A proof of ownership for a custodian may be a cryptographic proof (or may include a cryptographic proof or may be used to cryptographically prove) that a particular custodian 110 has, owns, and/or has been assigned a particular public key. For example, the proof of ownership for a custodian may be proof (or may include a proof or may be used to prove) that a public key and/or a public address of a public key belongs to a particular custodian 110. In example embodiments, the proof of ownership created by the proof of ownership processor 122 (and/or the processor 120 and/or the proof of management processor 124, as illustrated in FIG. 4B, and/or the proof of authority processor 126, as illustrated in at least FIG. 4D) may be used to prove that a particular public key belongs to a custodian 110 without a need to reveal the corresponding private key of the custodian 110. The proof of ownership for a custodian 110 may be in the form of (or may include) a digitally signed hash of a custodian payload (also referred to in the present disclosure as the "second payload", which will be further described below).

An example embodiment of the proof of ownership processor 122 may include a custodian payload generator (which may be similar to or the same as the custodian payload generator 124a, as further described in the present disclosure). Alternatively or in addition, the proof of ownership processor 122 (and/or processor 120 and/or proof of management processor 124, as illustrated in FIG. 4B, and/or proof of authority processor 126, as illustrated in FIG. 4D) may be configurable or configured to perform one or more functions or actions of the custodian payload generator. The proof of ownership processor 122 may also include a custodian proof of ownership hash generator (not shown). Alternatively or in addition, the proof of ownership processor 122 (and/or processor 120 and/or proof of management processor 124, as illustrated in FIG. 4B, and/or proof of authority processor 126, as illustrated in FIG. 4D) may be configurable or configured to perform one or more functions or actions of the custodian proof of ownership hash generator. The proof of ownership processor 122 may also include a signed custodian proof of ownership hash generator (not shown). Alternatively or in addition, the proof of ownership processor 122 (and/or processor 120 and/or proof of management processor 124, as illustrated in FIG. 4B, and/or proof of authority processor 126, as illustrated in FIG. 4D) may be configurable or configured to perform one or more functions or actions of the signed custodian proof of ownership hash generator. It is to be understood in the present disclosure that the custodian payload generator (and/or functions or actions of the custodian payload generator), the custodian proof of ownership hash generator (and/or functions or actions of the custodian proof of ownership hash generator), and signed custodian proof of ownership hash generator (and/or functions or actions of the signed custodian proof of ownership hash generator) may perform similar or substantially the same functions or actions as the owner payload generator 122a, the proof of ownership hash generator 122b, and signed proof of ownership hash generator 122c, respectively, without departing from the teachings of the present disclosure.

The Proof of Management Processor (e.g., Proof of Management Processor 124).

FIG. 5B illustrates an example embodiment of a proof of management processor (e.g., proof of management processor 124). The proof of management processor 124 may be configurable or configured to perform a proof of management process (e.g., proof of management process 640, as described in the present disclosure), including performing a proof of management setup process (e.g., proof of management process 640). In performing the proof of management process 640 (or proof of management setup process 640) for a digital asset owned by a user, the proof of management processor 124 generates or creates a proof of management of the digital asset. The proof of management of a digital asset can then be used to prove whether or not an entity who claims to be the custodian of the digital asset is in fact the authorized custodian of the digital asset. As will be further described in the present disclosure, such proof of management of a digital asset will include a signed proof of management hash (as generated by the signed proof of management hash generator 124c). The proof of management of a digital asset may also include a proof of management hash (as generated by the proof of management hash generator 124b). The proof of management of a digital asset may also include the public key (or corresponding public address of the public key) of the authorized custodian.

In example embodiments, the proof of management processor 124 may also perform a proof of management verification process (e.g., proof of management verification process 650, as described in the present disclosure). In performing the proof of management verification process 640 for a digital asset, the proof of management processor 124 can perform a verification or check as to whether or not an entity (who may be a natural person, company, corporation, organization, etc.) who claims to be the custodian of the digital asset is the authorized custodian of the digital asset.

It is to be understood in the present disclosure that, in addition to or in replacement of the proof of management processor 124, the processor 120 (and/or proof of authority processor 126, as illustrated in at least FIG. 4D) may also perform one or more functions or actions of the proof of management processor 124, including the proof of management process 640, the proof of management setup process 640, and/or the proof of management verification process 650, without departing from the teachings of the present disclosure.

The proof of management processor 124 may be configurable or configured to create a proof of management for a digital asset. As used in the present disclosure, a "proof of management" for a particular digital asset may be a cryptographic proof (or may include a cryptographic proof or may be used to cryptographically prove) that a particular custodian is the authorized custodian of the particular digital asset. For example, the proof of management for a particular digital asset may be proof (or may include a proof or may be used to prove) that a particular custodian is the authorized custodian of a particular digital asset having a particular public key and/or public address. In example embodiments, the proof of management created by the proof of management processor 124 (and/or the processor 120 and/or the proof of authority processor 126, as illustrated in at least FIG. 4D) may be used to prove that a particular custodian is the authorized custodian of a particular digital asset without a need to reveal the private key of the digital asset. As will be further described in the present disclosure, the proof of management for a particular digital asset may be in the form of (or may include) a digitally signed hash of one or more of the following: the owner payload (as described in the present disclosure); a custodian payload (also referred to in the present disclosure as the "second payload", which will be further described below); the proof of ownership hash, as generated by the proof of ownership hash generator 122b (as described in the present disclosure); and/or the signed proof of ownership hash, as generated by the signed proof of ownership hash generator 122c (as described in the present disclosure).

As illustrated in FIG. 5B, an example embodiment of the proof of management processor 124 may include a custodian payload generator (e.g., custodian payload generator 124a). Alternatively or in addition, the proof of management processor 124 (and/or processor 120 and/or proof of authority processor 126, as illustrated in at least FIG. 4D) may be configurable or configured to perform one or more functions or actions of the custodian payload generator 124a. The proof of management processor 124 may also include a proof of management hash generator (e.g., proof of management hash generator 124b). Alternatively or in addition, the proof of management processor 124 (and/or processor 120 and/or proof of authority processor 126, as illustrated in at least FIG. 4D) may be configurable or configured to perform one or more functions or actions of the proof of management hash generator 124b. The proof of management processor 124 may also include a signed proof of management hash generator (e.g., signed proof of management hash generator 124c). Alternatively or in addition, the proof of management processor 124 (and/or processor 120 and/or proof of authority processor 126, as illustrated in at least FIG. 4D) may be configurable or configured to perform one or more functions or actions of the signed proof of management hash generator 124c.

As illustrated in FIG. 5C, an example embodiment of the proof of management processor 124 may include an owner payload generator (e.g., owner payload generator 122a). Alternatively or in addition, the proof of management processor 124 (and/or processor 120 and/or proof of ownership processor 122, as illustrated in at least FIG. 4A, and/or proof of authority processor 126, as illustrated in at least FIG. 4D) may be configurable or configured to perform one or more functions or actions of the owner payload generator 122a. The proof of management processor 124 may also include a proof of ownership hash generator (e.g., proof of ownership hash generator 122b). Alternatively or in addition, the proof of management processor 124 (and/or processor 120 and/or proof of ownership processor 122, as illustrated in at least FIG. 4A, and/or proof of authority processor 126, as illustrated in at least FIG. 4D) may be configurable or configured to perform one or more functions or actions of the proof of ownership hash generator 122*b*. The proof of management processor 124 may also include a signed proof of ownership hash generator (e.g., signed proof of ownership hash generator 122*c*). Alternatively or in addition, the proof of management processor 124 (and/or processor 120 and/or proof of ownership processor 122, as illustrated in at least FIG. 4A, and/or proof of authority processor 126, as illustrated in at least FIG. 4D) may be configurable or configured to perform one or more functions or actions of the signed proof of ownership hash generator 122*c*. The proof of management processor 124 may also include a custodian payload generator (e.g., custodian payload generator 124*a*). Alternatively or in addition, the proof of management processor 124 (and/or processor 120 and/or proof of authority processor 126, as illustrated in at least FIG. 4D) may be configurable or configured to perform one or more functions or actions of the custodian payload generator 124*a*. The proof of management processor 124 may also include a proof of management hash generator (e.g., proof of management hash generator 124*b*). Alternatively or in addition, the proof of management processor 124 (and/or processor 120 and/or proof of authority processor 126, as illustrated in at least FIG. 4D) may be configurable or configured to perform one or more functions or actions of the proof of management hash generator 124*b*. The proof of management processor 124 may also include a signed proof of management hash generator (e.g., signed proof of management hash generator 124*c*). Alternatively or in addition, the proof of management processor 124 (and/or processor 120 and/or proof of authority processor 126, as illustrated in at least FIG. 4D) may be configurable or configured to perform one or more functions or actions of the signed proof of management hash generator 124*c*.

These elements of the proof of management processor 124 will now be further described with reference to the accompanying drawings.

The Owner Payload Generator (e.g., Owner Payload Generator 122*a*).

As illustrated in at least FIG. 4B and FIG. 5C, in example embodiments where the proof of management processor 124 includes the owner payload generator 122*a*, such owner payload generator 122*a* is configurable or configured to perform one or more of the same functions or actions as the owner payload generator 122*a* described above and in the present disclosure (e.g., as illustrated in at least FIGS. 4A and 5A), including the forming of an owner payload (or first payload) for a digital asset.

In example embodiments where the proof of management processor 124 performs the functions or actions of the owner payload generator 122*a*, the proof of management processor 124 is configurable or configured to perform the same functions or actions described above and in the present disclosure for the owner payload generator 122*a* (e.g., as illustrated in at least FIGS. 4A and 5A), including the forming of an owner payload (or first payload) for a digital asset.

The Proof of Ownership Hash Generator (e.g., Proof of Ownership Hash Generator 122*b*).

As illustrated in at least FIGS. 4B and 5C, in example embodiments where the proof of management processor 124 includes the proof of ownership hash generator 122*b*, such proof of ownership hash generator 122*b* is configurable or configured to perform one or more of the same functions or actions as the proof of ownership hash generator 122*b* described above and in the present disclosure (e.g., as illustrated in at least FIGS. 4A and 5A), including the generating of a proof of ownership hash for a digital asset.

In example embodiments where the proof of management processor 124 performs the functions or actions of the proof of ownership hash generator 122*b*, the proof of management processor 124 is configurable or configured to perform the same functions or actions described above and in the present disclosure for the proof of ownership hash generator 122*b* (e.g., as illustrated in at least FIGS. 4A and 5A), including the generating of a proof of ownership hash for a digital asset.

The Signed Proof of Ownership Hash Generator (e.g., Signed Proof of Ownership Hash Generator 122*c*).

As illustrated in at least FIGS. 4B and 5C, in example embodiments where the proof of management processor 124 includes the signed proof of ownership hash generator 122*c*, such signed proof of ownership hash generator 122*c* is configurable or configured to perform one or more of the same functions or actions as the signed proof of ownership hash generator 122*c* described above and in the present disclosure (e.g., as illustrated in at least FIGS. 4A and 5A), including the generating of a signed proof of ownership hash for a digital asset.

In example embodiments where the proof of management processor 124 performs the functions or actions of the signed proof of ownership hash generator 122*c*, the proof of management processor 124 is configurable or configured to perform the same functions or actions described above and in the present disclosure for the signed proof of ownership hash generator 122*c* (e.g., as illustrated in at least FIGS. 4A and 5A), including the generating of a signed proof of ownership hash for a digital asset.

The Custodian Payload Generator (e.g., Custodian Payload Generator 124*a*).

An example embodiment of the custodian payload generator (e.g., custodian payload generator 124*a*) may be configurable or configured to form a custodian payload (or second payload) for a digital asset. The custodian payload includes at least the public key of the custodian of the digital asset (and/or a corresponding public address for the public key of the custodian of the digital asset). In example embodiments, the custodian payload may also include a unique identifier (or custodian identifier), or the like, that can be used to uniquely, specifically, or unmistakably identify the custodian 110 of the digital asset. For example, the unique identifier may be a legal entity identifier (LEI) of the custodian 110. In some example embodiments, the custodian payload may also include other information including, but not limited to, a legal name of the custodian 110 (e.g., company name (cn) and organizational unit (ou) if the custodian 110 is a company with multiple organizational units); location of the custodian (e.g., city, state, province, and/or country); etc. The custodian payload may also include a format of the public address (e.g., when the custodian payload includes the public address for the public key of the custodian 110), an identification of a hashing algorithm used to generate the proof of management hash (as further described in the present disclosure), and/or an identification of the signature algorithm used to generate the signed proof of management hash (as further described in the present disclosure).

The custodian payload generator 124*a* may be configurable or configured to receive information to form the custodian payload via the I/O interface 121. After the custodian payload is formed by the custodian payload generator 124*a*, the custodian payload generator 124*a* may provide the formed custodian payload to the proof of management hash generator 124b, the proof of authority processor 126, the I/O interface 121, and/or the database interface 129. For example, the formed custodian payload may be provided to the proof of authority hash generator 126b of the proof of authority processor 126.

The Proof of Management Hash Generator (e.g., Proof of Management Hash Generator 124b).

An example embodiment of the proof of management hash generator (e.g., proof of management hash generator 124b) may be configurable or configured to generate a proof of management hash for the digital asset. The proof of management hash may be generated by hashing one or more of the following: the owner payload (as described in the present disclosure); the custodian payload; the proof of ownership hash, as generated by the proof of ownership hash generator 122b (as described in the present disclosure); and/or the signed proof of ownership hash, as generated by the signed proof of ownership hash generator 122c (as described in the present disclosure). In preferred embodiments, the proof of management hash is generated by hashing the custodian payload and the signed proof of ownership hash. The hashing algorithm used by the proof of ownership hash generator 122b may be any hashing algorithm including, but not limited to, SHA-256, SHA-3, etc. FIG. 7B (and FIG. 7C) illustrate examples of a proof of management hash and hashing algorithm used for the hashing, which are depicted in FIG. 7B as "N/vQ9SwunTeJV19I38ETAUI1x3K2yE2NFFs7fD5 Zd2k=" and "SHA-256", respectively. It is to be understood that any other hashing algorithm may be used to generate the proof of management hash without departing from the teachings of the present disclosure. While FIG. 7B (and FIG. 7A for the proof of ownership and FIG. 7C for the proof of authority) illustrates an example of the proof of management in JSON, it is to be understood that the proof of management (and/or proof of ownership and/or proof of authority) may be written in any other format without departing from the teachings of the present disclosure.

The proof of management hash generator 124b may be configurable or configured to receive the custodian payload from the custodian payload generator 124a. After the proof of management hash is generated by the proof of management hash generator 124b, the proof of management hash generator 124b may provide the generated proof of management hash to the signed proof of management hash generator 124c, the proof of authority processor 126, the I/O interface 121, and/or the database interface 129. For example, the generated proof of management hash may be provided to the proof of authority hash generator 126a of the proof of authority processor 126 (as illustrated in FIGS. 5B, 5C, and 5E).

The Signed Proof of Management Hash Generator (e.g., Signed Proof of Management Hash Generator 124c).

An example embodiment of the signed proof of management hash generator (e.g., signed proof of management hash generator 124c) may be configurable or configured to generate a signed proof of management hash for the digital asset. The signed proof of management hash may be generated by digitally signing the proof of management hash, as generated by the proof of management hash generator 124b. In an example embodiment, the authorized custodian 110 performs the digital signing of the proof of management hash so as to generate the signed proof of management hash. The digital signature algorithm used by the signed proof of management hash generator 124c may be any digital signature algorithm such as SHA-256 with ECDSA. FIG. 7B (and FIG. 7C) illustrate examples of a signed proof of management hash and digital signature algorithm used for the signing, which are depicted in FIG. 7B as "MEQCIEOu0eWeQ9033LvyqH7j/ 2EQuzGAKvvTQWFwMPVSLgWkAiBjppf-blesKtbGeTdVxu NhC19BnxbxQK1+92gfyY9qCTw==" and "SHA-256withECDSA", respectively. It is to be understood that any other digital signature algorithm may be used to generate the signed proof of management hash without departing from the teachings of the present disclosure.

The signed proof of management hash generator 124c may be configurable or configured to receive the proof of management hash from the proof of management hash generator 124b. After the signed proof of management hash is generated by the signed proof of management hash generator 124c, the signed proof of management hash generator 124c may provide the signed proof of management hash to the proof of authority processor 126, the I/O interface 121, and/or the database interface 129. For example, the signed proof of management hash may be provided to the proof of authority hash generator 126a of the proof of authority processor 126 (as illustrated in FIGS. 5B, 5C, and 5E).

The Proof of Authority Processor (e.g., Proof of Authority Processor 126).

Figure 5D:
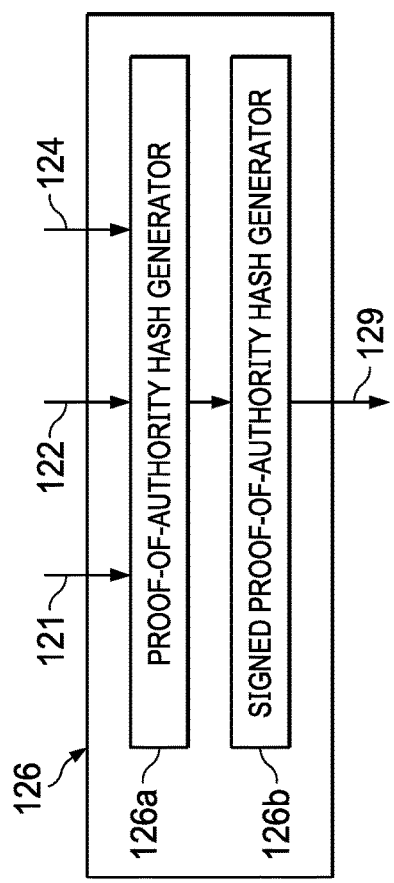
FIG. 5D is an illustration of an example embodiment of a proof of authority processor.

FIG. 5D illustrates an example embodiment of a proof of authority processor (e.g., proof of authority processor 126). The proof of authority processor 126 may be configurable or configured to perform a proof of authority process (e.g., proof of authority process 660, as described in the present disclosure), including performing a proof of authority setup process (e.g., proof of authority process 660). In performing the proof of authority process 660 (or proof of authority setup process 660) for a digital asset owned by a user, the proof of authority processor 126 generates or creates a proof of authority of the digital asset. The proof of authority of a digital asset can then be used to prove whether or not an entity who claims to be the authorized custodian of a digital asset has been authorized by the owner of the digital asset to be the authorized custodian of the digital asset. As will be further described in the present disclosure, such proof of authority of a digital asset will include a signed proof of authority hash (as generated by the signed proof of authority hash generator 126c). The proof of authority of a digital asset may also include a proof of authority hash (as generated by the proof of authority hash generator 126b). The proof of authority of a digital asset may also include the public key (or corresponding public address of the public key) of the digital asset.

In example embodiments, the proof of authority processor 126 may also perform a proof of authority verification process (e.g., proof of authority verification process 670, as described in the present disclosure). In performing the proof of authority verification process 660 for a digital asset, the proof of authority processor 126 can perform a verification or check as to whether or not an entity (who may be a natural person, company, corporation, organization, etc.) who claims to be the custodian of the digital asset has been authorized by the owner of the digital asset to be the custodian of the digital asset.

It is to be understood in the present disclosure that, in addition to or in replacement of the proof of authority processor 126, the processor 120 may also perform one or more functions or actions of the proof of authority processor 126, including the proof of authority process 660, the proof of authority setup process 660, and/or the proof of authority verification process 670, without departing from the teachings of the present disclosure.

The proof of authority processor 126 may be configurable or configured to create a proof of authority for a digital asset. As used in the present disclosure, a "proof of authority" for a particular digital asset may be a cryptographic proof (or may include a cryptographic proof or may be used to cryptographically prove) that a particular custodian has been authorized by the owner of a particular digital asset to be the authorized custodian of the digital asset. For example, the proof of authority for a particular digital asset may be proof (or may include a proof or may be used to prove) that the owner of a particular digital asset having a particular public key and/or public address has authorized a particular custodian to be the authorized custodian of the digital asset. In example embodiments, the proof of authority created by the proof of authority processor 126 (and/or the processor 120) may be used to prove that the owner of a particular digital asset has authorized a particular custodian to be the authorized custodian of the digital asset without a need to reveal the private key of the digital asset. As will be further described in the present disclosure, the proof of authority for a particular digital asset may be in the form of (or may include) a digitally signed hash of one of the following: at least the owner payload (as described in the present disclosure) and the custodian payload (as described in the present disclosure); or at least the proof of management hash, as generated by the proof of management hash generator 124b (as described in the present disclosure); or at least the signed proof of management hash, as generated by the signed proof of management hash generator 124c (as described in the present disclosure).

As illustrated in FIG. 5D, an example embodiment of the proof of authority processor 126 may include a proof of authority hash generator (e.g., proof of authority hash generator 126a). Alternatively or in addition, the proof of authority processor 126 (and/or processor 120) may be configurable or configured to perform one or more functions or actions of the proof of authority hash generator 126a. The proof of authority processor 126 may also include a signed proof of authority hash generator (e.g., signed proof of authority hash generator 126b). Alternatively or in addition, the proof of authority processor 126 (and/or processor 120) may be configurable or configured to perform one or more functions or actions of the signed proof of authority hash generator 126b.

As illustrated in FIG. 5E, an example embodiment of the proof of authority processor 126 may include an owner payload generator (e.g., owner payload generator 122a). Alternatively or in addition, the proof of authority processor 126 (and/or processor 120 and/or proof of ownership processor 122, as illustrated in at least FIG. 4A, and/or proof of management processor 124, as illustrated in at least FIG. 4B, and/or proof of authority processor 126, as illustrated in at least FIG. 4D) may be configurable or configured to perform one or more functions or actions of the owner payload generator 122a. The proof of authority processor 126 may also include a proof of ownership hash generator (e.g., proof of ownership hash generator 122b). Alternatively or in addition, the proof of authority processor 126 (and/or processor 120 and/or proof of ownership processor 122, as illustrated in at least FIG. 4A, and/or proof of management processor 124, as illustrated in at least FIG. 4B, and/or proof of authority processor 126, as illustrated in at least FIG. 4D) may be configurable or configured to perform one or more functions or actions of the proof of ownership hash generator 122b. The proof of authority processor 126 may also include a signed proof of ownership hash generator (e.g., signed proof of ownership hash generator 122c). Alternatively or in addition, the proof of authority processor 124 (and/or processor 120 and/or proof of ownership processor 122, as illustrated in at least FIG. 4A, and/or proof of management processor 124, as illustrated in at least FIG. 4B, and/or proof of authority processor 126, as illustrated in at least FIG. 4D) may be configurable or configured to perform one or more functions or actions of the signed proof of ownership hash generator 122c. The proof of authority processor 126 may also include a custodian payload generator (e.g., custodian payload generator 124a). Alternatively or in addition, the proof of authority processor 126 (and/or processor 120 and/or proof of management processor 124, as illustrated in at least FIGS. 4B and 4C, and/or proof of authority processor 126, as illustrated in at least FIG. 4D) may be configurable or configured to perform one or more functions or actions of the custodian payload generator 124a. The proof of authority processor 126 may also include a proof of management hash generator (e.g., proof of management hash generator 124b). Alternatively or in addition, the proof of authority processor 126 (and/or processor 120 and/or proof of management processor 124, as illustrated in at least FIGS. 4B and 4C, and/or proof of authority processor 126, as illustrated in at least FIG. 4D) may be configurable or configured to perform one or more functions or actions of the proof of management hash generator 124b. The proof of authority processor 126 may also include a signed proof of management hash generator (e.g., signed proof of management hash generator 124c). Alternatively or in addition, the proof of authority processor 126 (and/or processor 120 and/or proof of management processor 124, as illustrated in at least FIGS. 4B and 4C, and/or proof of authority processor 126, as illustrated in at least FIG. 4D) may be configurable or configured to perform one or more functions or actions of the signed proof of management hash generator 124c. The proof of authority processor 126 may also include a proof of authority hash generator (e.g., proof of authority hash generator 126a). Alternatively or in addition, the proof of authority processor 126 (and/or processor 120) may be configurable or configured to perform one or more functions or actions of the proof of authority hash generator 126a. The proof of authority processor 126 may also include a signed proof of authority hash generator (e.g., signed proof of authority hash generator 126b). Alternatively or in addition, the proof of authority processor 126 (and/or processor 120) may be configurable or configured to perform one or more functions or actions of the signed proof of authority hash generator 126b.

These elements of the proof of authority processor 126 will now be further described with reference to the accompanying drawings.

The Owner Payload Generator (e.g., Owner Payload Generator 122a).

As illustrated in at least FIG. 4D and FIG. 5E, in example embodiments where the proof of authority processor 126 includes the owner payload generator 122a, such owner payload generator 122a is configurable or configured to perform one or more of the same functions or actions as the owner payload generator 122a described above and in the present disclosure (e.g., as illustrated in at least FIGS. 4A and 5A), including the forming of an owner payload (or first payload) for a digital asset.

In example embodiments where the proof of authority processor 126 performs the functions or actions of the owner payload generator 122a, the proof of authority processor 126 is configurable or configured to perform the same functions or actions described above and in the present disclosure for the owner payload generator 122a (e.g., as illustrated in at least FIGS. 4A and 5A), including the forming of an owner payload (or first payload) for a digital asset.

The Proof of Ownership Hash Generator (e.g., Proof of Ownership Hash Generator 122b).

As illustrated in at least FIGS. 4D and 5E, in example embodiments where the proof of authority processor 126 includes the proof of ownership hash generator 122b, such proof of ownership hash generator 122b is configurable or configured to perform one or more of the same functions or actions as the proof of ownership hash generator 122b described above and in the present disclosure (e.g., as illustrated in at least FIGS. 4A and 5A), including the generating of a proof of ownership hash for a digital asset.

In example embodiments where the proof of authority processor 126 performs the functions or actions of the proof of ownership hash generator 122b, the proof of authority processor 126 is configurable or configured to perform the same functions or actions described above and in the present disclosure for the proof of ownership hash generator 122b (e.g., as illustrated in at least FIGS. 4A and 5A), including the generating of a proof of ownership hash for a digital asset.

The Signed Proof of Ownership Hash Generator (e.g., Signed Proof of Ownership Hash Generator 122c).

As illustrated in at least FIGS. 4D and 5E, in example embodiments where the proof of authority processor 126 includes the signed proof of ownership hash generator 122c (e.g., as illustrated in at least FIGS. 4D and 5E), such signed proof of ownership hash generator 122c is configurable or configured to perform one or more of the same functions or actions as the signed proof of ownership hash generator 122c described above and in the present disclosure (e.g., as illustrated in at least FIGS. 4A and 5A), including the generating of a signed proof of ownership hash for a digital asset.

In example embodiments where the proof of authority processor 126 performs the functions or actions of the signed proof of ownership hash generator 122c, the proof of authority processor 126 is configurable or configured to perform the same functions or actions described above and in the present disclosure for the signed proof of ownership hash generator 122c (e.g., as illustrated in at least FIGS. 4A and 5A), including the generating of a signed proof of ownership hash for a digital asset.

The Custodian Payload Generator (e.g., Custodian Payload Generator 124a).

As illustrated in at least FIGS. 4C, 4D, and 5E, in example embodiments where the proof of authority processor 126 includes the custodian payload generator 124a, such custodian payload generator 124a is configurable or configured to perform one or more of the same functions or actions as the custodian payload generator 124a described above and in the present disclosure (e.g., as illustrated in at least FIGS. 4A and 5C), including the forming of a custodian payload (or second payload) for a digital asset.

In example embodiments where the proof of authority processor 126 performs the functions or actions of the custodian payload generator 124a, the proof of authority processor 126 is configurable or configured to perform the same functions or actions described above and in the present disclosure for the custodian payload generator 124a (e.g., as illustrated in at least FIGS. 4A and 5C), including the forming of an custodian payload (or second payload) for a digital asset.

The Proof of Management Hash Generator (e.g., Proof of Management Hash Generator 124b).

As illustrated in at least FIGS. 4C, 4D, and 5E, in example embodiments where the proof of authority processor 126 includes the proof of management hash generator 124b, such proof of management hash generator 124b is configurable or configured to perform one or more of the same functions or actions as the proof of management hash generator 124b described above and in the present disclosure (e.g., as illustrated in at least FIGS. 4A and 5C), including the generating of a proof of management hash for a digital asset.

In example embodiments where the proof of authority processor 126 performs the functions or actions of the proof of management hash generator 124b, the proof of authority processor 126 is configurable or configured to perform the same functions or actions described above and in the present disclosure for the proof of management hash generator 124b (e.g., as illustrated in at least FIGS. 4A and 5C), including the generating of a proof of management hash for a digital asset.

The Signed Proof of Management Hash Generator (e.g., Signed Proof of Management Hash Generator 124c).

As illustrated in at least FIGS. 4C, 4D, and 5E, in example embodiments where the proof of authority processor 126 includes the signed proof of management hash generator 124c, such signed proof of management hash generator 124c is configurable or configured to perform one or more of the same functions or actions as the signed proof of management hash generator 124c described above and in the present disclosure (e.g., as illustrated in at least FIGS. 4A and 5C), including the generating of a signed proof of management hash for a digital asset.

In example embodiments where the proof of authority processor 126 performs the functions or actions of the signed proof of management hash generator 124c, the proof of authority processor 126 is configurable or configured to perform the same functions or actions described above and in the present disclosure for the signed proof of management hash generator 124c (e.g., as illustrated in at least FIGS. 4A and 5C), including the generating of a signed proof of management hash for a digital asset.

The Proof of Authority Hash Generator (e.g., Proof of Authority Hash Generator 126a).

An example embodiment of the proof of authority hash generator (e.g., proof of authority hash generator 126a) may be configurable or configured to generate a proof of authority hash for the digital asset. The proof of authority hash may be generated by hashing at least the owner payload (as described in the present disclosure) and the custodian payload (as described in the present disclosure). The proof of authority hash may also be generated by hashing at least the proof of management hash, as generated by the proof of management hash generator 124b (as described in the present disclosure). The proof of authority hash may also be generated by hashing at least the signed proof of management hash, as generated by the signed proof of management hash generator 124c (as described in the present disclosure). In preferred embodiments, the proof of authority hash is generated by hashing the signed proof of management hash. The hashing algorithm used by the proof of authority hash generator 126a may be any hashing algorithm including, but not limited to, SHA-256, SH-3, etc. FIG. 7C illustrates an example of a proof of authority hash and hashing algorithm used for the hashing, which are depicted in FIG. 7C as "jbAe0yuxqZcP7EMNjdXbq8PSJqKcZSH8A8e3xsD718I=" and "SHA-256", respectively. It is to be understood that any other hashing algorithm may be used to generate the proof of authority hash without departing from the teachings of the present disclosure. While FIG. 7C (and FIG. 7B for the proof of management and FIG. 7A for the proof of ownership) illustrates an example of the proof of authority in JSON, it is to be understood that the proof of authority (and/or proof of management and/or proof of ownership) may be written in any other format without departing from the teachings of the present disclosure.

After the proof of authority hash is generated by the proof of authority hash generator 126a, the proof of authority hash generator 126a may provide the generated proof of authority hash to the signed proof of authority hash generator 126b, the 110 interface 121, and/or the database interface 129.

The Signed Proof of Authority Hash Generator (e.g., Signed Proof of Authority Hash Generator 126b).

An example embodiment of the signed proof of authority hash generator (e.g., signed proof of authority hash generator 126b) may be configurable or configured to generate a signed proof of authority hash for the digital asset. The signed proof of authority hash may be generated by digitally signing the proof of authority hash, as generated by the proof of authority hash generator 126a. In an example embodiment, the owner 102 of the digital asset performs the digital signing of the proof of authority hash so as to generate the signed proof of authority hash. The digital signature algorithm used by the signed proof of authority hash generator 124c may be any digital signature algorithm such as SHA-256 with ECDSA. FIG. 7C illustrates an example of a signed proof of authority hash and digital signature algorithm used for the signing, which are depicted in FIG. 7C as "MEYCIQCm1lT4coa+4/0+u2iEpu7TV1EFKM1OtOe10/ 1vKzTXLQIhAKESNP163qrY1Uu2b0wFi EgXcb4wOU+ uqR7Vb8gbtYOL" and "SHA-256withECDSA", respectively. It is to be understood that any other digital signature algorithm may be used to generate the signed proof of authority hash without departing from the teachings of the present disclosure.

The signed proof of authority hash generator 126b may be configurable or configured to receive the proof of authority hash from the proof of authority hash generator 126a. After the signed proof of authority hash is generated by the signed proof of authority hash generator 126b, the signed proof of authority hash generator 126b may provide the signed proof of authority hash to the I/O interface 121 and/or the database interface 129.

Example Embodiments of a Method of Managing Digital Assets (e.g., Method 600).

As illustrated in at least FIG. 6A, an example embodiment of a method (e.g., method 600) for managing digital assets includes performing a proof of ownership (or "PoO") process for the digital assets (e.g., proof of ownership process 620). The method 600 may include performing a proof of management (or "PoM") process for the digital assets (e.g., proof of management process 640). The method 600 may include performing a proof of authority ("PoA") process for the digital assets (e.g., proof of authority process 660). The method 600 may also include a proof of ownership verification process for the digital assets (e.g., proof of ownership verification process 630). The method 600 may also include a proof of management verification process for the digital assets (e.g., proof of management verification process 650). The method may also include a proof of authority verification process for the digital assets (e.g., proof of authority verification process 670). These and other processes and/or actions of method 600 will now be further described with reference to the accompanying drawings.

The Proof of Ownership Process or Proof of Ownership Setup Process (e.g., Proof of Ownership Process 620).

In an example embodiment, the proof of ownership process or proof of ownership setup process (e.g., proof of ownership process 620) may be used to create a proof of ownership for a digital asset. More specifically, the proof of ownership process 620 may be used to create a cryptographic proof (or may be used to cryptographically prove) that a particular user (or owner) 102 owns a particular digital asset. For example, the proof of ownership process 620 may be used to create a proof (or may be used to prove) that a public key of a particular digital asset and/or a public address of a public key of a particular digital asset (e.g., a crypto address such as a Bitcoin or BTC public address or ETH public address) belongs to a particular user (or owner) 102. In example embodiments, the proof of ownership process 620 may be used to prove ownership of a particular digital asset without a need to reveal the private key of the digital asset. As will be further described in the present disclosure, the proof of ownership process 620 creates or generates a hash of an owner payload (or first payload), which is referred to herein as the proof of ownership hash. Thereafter, the proof of ownership process 620 creates or generates a digitally signed hash of an owner payload (or first payload), which is referred to herein as the signed proof of ownership hash. As used in the present disclosure, a digitally signed hash (or signed hash) of a given payload refers to a hashing of the payload (using a particular hashing algorithm) to form a hashed payload, followed by a digital signing (or signing) of the hashed payload (using a particular digital signature algorithm) to form the digitally signed hash of the payload.

The proof of ownership of a digital asset can be used to prove whether or not an entity who claims to be the owner of a digital asset is in fact the owner of the digital asset. The proof of ownership of a digital asset will include a signed proof of ownership hash. The proof of ownership of a digital asset may also include a proof of ownership hash. The proof of ownership of a digital asset may also include the public key (or corresponding public address of the public key) of the digital asset.

FIG. 6B illustrates an example embodiment of the proof of ownership process 620. The proof of ownership process 620 may include forming an owner payload (e.g., action 621). The proof of ownership process 620 may also include generating a proof of ownership hash (e.g., action 622). The proof of ownership process 620 may also include generating a signed proof of ownership hash (e.g., action 623). These and other actions of the proof of ownership process 620 will not be further described below.

Forming an Owner Payload (e.g., Action 621).

In an example embodiment, the proof of ownership process 620 may include forming an owner payload (or first payload) for a digital asset (e.g., action 621). In forming the owner payload, the proof of ownership process 620 may include receiving information to be placed into the owner payload. For example, the proof of ownership process 620 may include receiving a public key of the digital asset (and/or a corresponding public address for a public key of the digital asset), and including the public key (or public address) in the owner payload. The proof of ownership process 620 may also include receiving an indication of the format for the public address of the digital asset, and including the format in the owner payload. FIG. 7A (and FIGS. 7B and 7C) illustrate example representations of a public address of a digital asset and corresponding format for the public address of the digital asset, which are depicted in FIG. 7A as "MFkwEwYHKoZIzj0CAQYIKoZIzj0DAQcDQgAECq F1zy0USFrikJbrNRO3ouKOXPxq8wMKb NbH3Fukg8tRjHX8AZ3U5IZBiVaWXePopi9uttkmL1TQ vhmBodCGiw=" and "EC#secp256r1", respectively. The proof of ownership process 620 may also include receiving a unique identifier, or the like, that can be used to uniquely, specifically, or unmistakably identify the owner 102 of the digital asset. For example, the unique identifier may be a legal entity identifier (LEI) of the owner 102. The proof of ownership process 620 may also include receiving other information including, but not limited to, a legal name of the owner (e.g., company name (cn) and organizational unit (ou) if the owner is a company with multiple organizational units); location of the owner (e.g., city, state, province, and/or country); a date and/or time stamp (e.g., creation time of the digital asset and/or payload); etc. The proof of ownership process 620 may also include receiving a format of the public address (e.g., when the owner payload includes the public address for the public key of the digital asset), an identification of a hashing algorithm used to generate the proof of ownership hash (as further described in the present disclosure), and/or an identification of the signature algorithm used to generate the signed proof of ownership hash (as further described in the present disclosure). FIG. 7A illustrates an example representation of a formed owner payload, as provided within the "ownerPayload" section.

After forming the owner payload, the formed owner payload may be provided to other actions and/or processes, including the generating of the proof of ownership hash (e.g., action 622), the proof of management process 640, and/or the proof of authority process 660. The formed owner payload may also be accessible or provided to the custodian 110 and/or database 130 in example embodiments. For example, the formed owner payload may be provided as input for generating the proof of management hash (e.g., action 644). As another example, the formed owner payload may be provided as input for generating the proof of authority hash (e.g., action 665).

Generating the Proof of Ownership Hash (e.g., Action 622).

In an example embodiment, the proof of ownership process 620 may include generating a proof of ownership hash for the digital asset (e.g., action 622). The proof of ownership hash may be generated by hashing at least the owner payload, as formed in action 621. The hashing algorithm used for the hashing may be any hashing algorithm including, but not limited to, SHA-256, SHA-3, etc. FIG. 7A (and FIGS. 7B and 7C) illustrate examples of a proof of ownership hash and hashing algorithm used for the hashing, which are depicted in FIG. 7A as "E6b1rZamZoR3MlymGdIXvr3kQzdUT3Z5ogaYF+ZLgqw=" and "SHA-256", respectively. It is to be understood that any other hashing algorithm may be used to generate the proof of ownership hash without departing from the teachings of the present disclosure.

After generating the proof of ownership hash, the formed proof of ownership hash may be provided to other actions and/or processes, including the generating of the signed proof of ownership hash (e.g., action 623), the proof of management process 640, and/or the proof of authority process 660. The generated proof of ownership hash may also be accessible or provided to the custodian 110 and/or database 130 in example embodiments. For example, the generated proof of ownership hash may be provided as input for generating the proof of management hash (e.g., action 644).

Generating the Signed Proof of Ownership Hash (e.g., Action 623).

An example embodiment of the proof of ownership process 620 may include generating a signed proof of ownership hash for the digital asset (e.g., action 623). The signed proof of ownership hash may be generated by digitally signing the proof of ownership hash, as generated in action 622. In an example embodiment, the private key of the digital asset is used to digitally sign the proof of ownership hash so as to generate the signed proof of ownership hash. The digital signature algorithm used for the digital signature may be any digital signature algorithm such as SHA-256 with ECDSA. FIG. 7A (and FIGS. 7B and 7C) illustrate examples of a signed proof of ownership hash and digital signature algorithm used for the signing, which are depicted in FIG. 7A as "MEYCIQCeYGm81dYn4I7h8c1y/zrW1RypWE1hXbETaz6XWu41OwIhAOAczqnS7IAbnM 6Vg4mF+OqL3+XBvDbuONNYttHhAk9c" and "SHA-256withECDSA", respectively. It is to be understood that any other digital signature algorithm may be used to generate the signed proof of ownership hash without departing from the teachings of the present disclosure.

After generating the signed proof of ownership hash, the signed proof of ownership hash may be provided to other actions and/or processes, including the proof of management process 640 and/or the proof of authority process 660. The signed proof of ownership hash may also be accessible or provided to the custodian 110 and/or database 130 in example embodiments. For example, the signed proof of ownership hash may be provided as input for the generating of the proof of management hash.

The Proof of Ownership Verification Process (e.g., Proof of Ownership Verification Process 630).

In an example embodiment, the proof of ownership verification process (e.g., proof of ownership verification process 630) may be used to verify a proof of ownership for a digital asset. More specifically, the proof of ownership verification process 630 may be used to cryptographic verify that a particular user (or owner) 102 owns a particular digital asset. For example, the proof of ownership verification process 630 may be used to verify that a public key of a particular digital asset and/or a public address of a public key of a particular digital asset (e.g., a crypto address such as a Bitcoin or BTC public address or ETH public address) belongs to a particular user (or owner) 102. In example embodiments, the proof of ownership verification process 630 may be used to verify ownership of a particular digital asset without a need to reveal the private key of the digital asset.

Figure 6C:
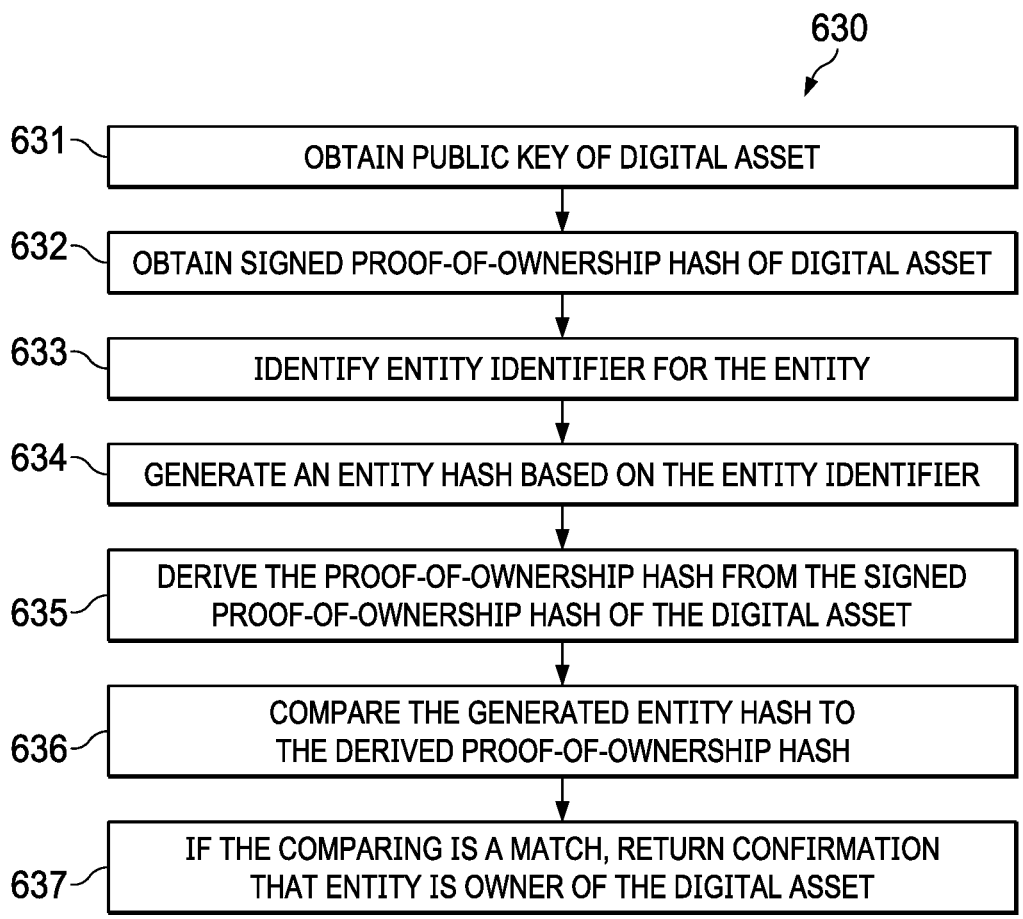
FIG. 6C is an illustration of an example embodiment of a proof of ownership verification process.

FIG. 6C illustrates an example embodiment of the proof of ownership verification process 630 to verify whether an entity is the owner of a digital asset. It should be noted that the "entity" may be any person, company, and/or other legal entity that is claiming to be the owner of the digital asset (i.e., the entity that is being verified or checked so as to see whether such entity is indeed the owner of the digital asset). The proof of ownership verification process 630 may include obtaining a public key of the digital asset (e.g., action 631). For example, the public key of the digital asset may be stored in and/or accessible/available (e.g., publicly available) from database 130. The proof of ownership verification process 630 may also include obtaining a signed proof of ownership hash of the digital asset (e.g., action 632) (e.g., obtaining from the database 130). The proof of ownership verification process 630 may also include identifying an entity identifier (and/or other information required to verify the entity) for the entity (e.g., action 633). The proof of ownership verification process 630 may also include generating an entity hash (e.g., action 634). The proof of ownership verification process 630 may also include deriving the proof of ownership hash from the signed proof of ownership hash of the digital asset (e.g., action 635). The proof of ownership verification process 630 may also include comparing the generated entity hash to the derived proof of ownership hash (e.g., action 636). The proof of ownership verification process 630 may also include returning confirmation that the entity is the owner of the digital asset when the comparing in action 636 is a match (e.g., action 637). These and other actions of the proof of ownership verification process 630 will not be further described below.

Obtaining a Public Key of the Digital Asset (e.g., Action 631).

In an example embodiment, the proof of ownership verification process 630 may include obtaining a public key of the digital asset (e.g., action 631). Alternatively or in addition, the proof of ownership verification process 630 may include obtaining a public address of the public key of the digital asset.

Obtaining a Signed Proof of Ownership Hash of the Digital Asset (e.g., Action 632).

In an example embodiment, the proof of ownership verification process 630 may include obtaining a signed proof of ownership hash of the digital asset (e.g., action 632). Alternatively or in addition, the proof of ownership verification process 630 may include obtaining the proof of ownership hash of the digital asset.

Identifying an Entity Identifier for the Entity (e.g., Action 633).

The proof of ownership verification process 630 may also include identifying an entity identifier for the entity that claims to be the owner of the digital asset (e.g., action 633). The entity identifier may include one or more forms of information pertaining to the entity, including the types of forms of information used in creating an owner payload (as described above and in the present disclosure). For example, the entity identifier may be or include a legal entity identifier (LEI) of the entity. The entity identifier may also include a legal name of the entity (e.g., company name (cn) and organizational unit (ou) if the entity is a company with multiple organizational units); location of the entity (e.g., city, state, province, and/or country); a date and/or time stamp (e.g., creation time of the digital asset and/or payload); etc. The entity identifier may also include a format of the public address of the digital asset, hashing algorithm used to generate the proof of ownership hash, and/or signature algorithm used to generate the signed proof of ownership hash.

Generating an Entity Hash (e.g., Action 634)

The proof of ownership verification process 630 may also include generating an entity hash (e.g., action 634). The entity hash may be generated by hashing the public key of the digital asset (and/or public address for the public key of the digital asset) and the entity identifier, as obtained in action 633. It is to be understood that the entity hash must be generated in view of the information used to generate the proof of ownership hash. For example, if the proof of ownership hash was generated by hashing the owner payload, then the entity hash must also be generated by hashing the entity identifier (having the same type and quantity of information as the owner payload; for example, if the owner payload only includes the public key of the digital asset and a LEI for the owner, then the entity identifier should also include only the public key of the entity and the LEI for the entity). The hashing algorithm used to generate the entity hash is the hashing algorithm identified in action 633 (i.e., the hashing algorithm used to generate the proof of ownership hash).

Deriving the Proof of Ownership Hash from the Signed Proof of Ownership Hash of the Digital Asset (e.g., Action 635).

The proof of ownership verification process 630 may also include deriving the proof of ownership hash from the signed proof of ownership hash of the digital asset (e.g., action 635). The proof of ownership hash may be derived by decrypting, using the public key of the digital asset, the signed proof of ownership hash.

Comparing the Generated Entity Hash to the Derived Proof of Ownership Hash (e.g., Action 636).

The proof of ownership verification process 630 may also include comparing the generated entity hash to the derived proof of ownership hash (e.g., action 636). More specifically, the entity hash generated in action 634 is compared with the proof of ownership hash derived in action 635.

Returning Confirmation that the Entity is the Owner of the Digital Asset when the Comparing in Action 636 is a Match (e.g., Action 637).

The proof of ownership verification process 630 may also include returning a confirmation that the entity is the owner of the digital asset when the comparing of the generated entity hash to the derived proof of ownership hash is a match. More specifically, if the entity hash generated in action 634 matches the proof of ownership hash, then the entity is proven to be the owner of the digital asset.

The proof of ownership verification process 630 may also include returning a confirmation that the entity is not the owner of the digital asset when the comparing of the generated entity hash to the derived proof of ownership hash is not a match. More specifically, if the entity hash generated in action 634 is not a match to the proof of ownership hash, then the entity is not proven to be the owner of the digital asset.

Another Example Embodiment of a Proof of Ownership Verification Process.

Another example embodiment of the proof of ownership verification process, which is used to verify whether or not an entity is the owner of a digital asset, may include obtaining a public key of the digital asset. For example, the public key of the digital asset may be stored in and/or accessible/available (e.g., publicly available) from database 130. The proof of ownership verification process may also include obtaining a signed proof of ownership hash of the digital asset (e.g., obtaining from the database 130). In addition to obtaining the signed proof of ownership hash of the digital asset, the proof of ownership verification process may also include obtaining a proof of ownership hash of the digital asset. The proof of ownership verification process may also include identifying an entity identifier (and/or other information required to verify the entity) for the entity who is claiming to be the owner of the digital asset. The proof of ownership verification process may also include creating an entity payload in the same manner as described above for the owner payload. The proof of ownership verification process may also include generating an entity hash for the entity payload in the same manner as described above for the proof of ownership hash (and using the same hashing algorithm as used for the proof of ownership hash). The proof of ownership verification process may also include comparing the generated entity hash to the obtained proof of ownership hash of the digital asset (e.g., as obtained from database 130). If the comparing does not result in a match, the proof of ownership verification process has verified that the entity is not the owner of the digital asset. If the comparing results in a match, the proof of ownership verification process may also include using the public key of the digital asset, the entity hash (and/or the proof of ownership hash), and the signed proof of ownership hash of the digital asset to verify that the signed proof of ownership hash was indeed signed by the private key of the digital asset (e.g., by using the public key of the digital asset and applying it to the signed proof of ownership hash).

The Proof of Management Process or Proof of Management Setup Process (e.g., Proof of Management Process 640).

In an example embodiment, the proof of management process or proof of management setup process (e.g., proof of management process 640 may be used to create a proof of management for a digital asset. More specifically, the proof of management process 640 may be used to create a cryptographic proof (or may include a cryptographic proof or may be used to cryptographically prove) that a particular custodian is the authorized custodian of the particular digital asset. For example, the proof of management may be used to create a proof (or may be used to prove) that a particular custodian is the authorized custodian of a particular digital asset having a particular public key and/or public address. In example embodiments, the proof of management process may be used to prove that a particular custodian is the authorized custodian of a particular digital asset without a need to reveal the private key of the digital asset. As will be further described in the present disclosure, the proof of management process for a particular digital asset creates or generates a digitally signed hash of one or more of the following: the owner payload (as described in the present disclosure); a custodian payload (or second payload, as described in the present disclosure); the proof of ownership hash; and/or the signed proof of ownership hash.

The proof of management of a digital asset can be used to prove whether or not an entity who claims to be the custodian of a digital asset is in fact the authorized custodian of the digital asset. The proof of management of a digital asset will include a signed proof of management hash. The proof of management of a digital asset may also include a proof of management hash. The proof of management of a digital asset may also include the public key (or corresponding public address of the public key) of the authorized custodian of the digital asset.

Figure 6D:
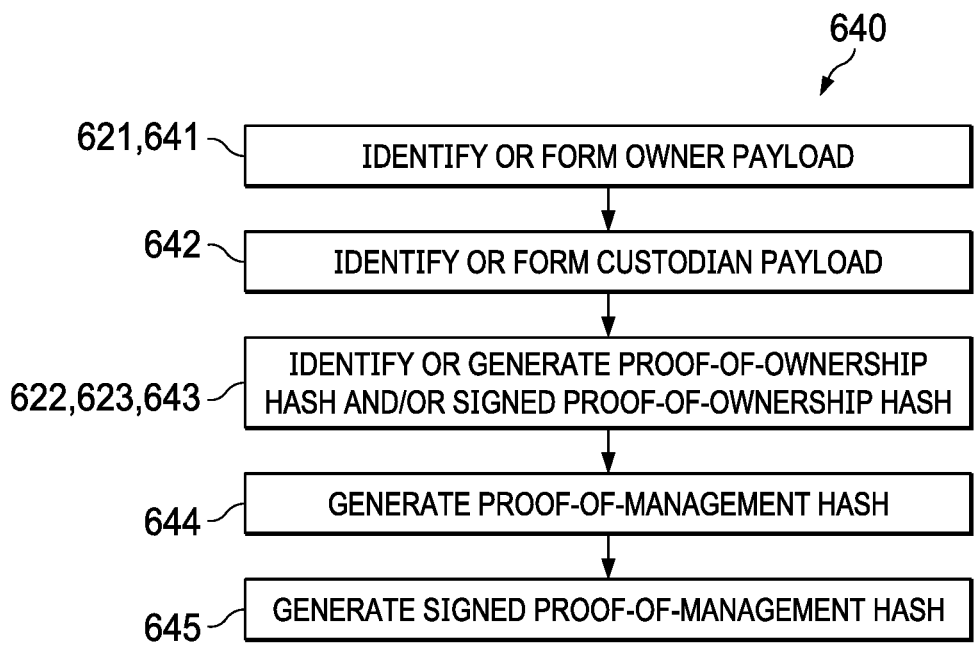
FIG. 6D is an illustration of an example embodiment of a proof of management process or proof of management setup process.

FIG. 6D illustrates an example embodiment of the proof of management process 640. The proof of management process 640 may include identifying or forming an owner payload (e.g., action 641, or 621). The proof of management process 640 may also include identifying or forming a custodian payload (e.g., action 642). The proof of management process 640 may also include identifying or generating a proof of ownership hash and/or a signed proof of ownership hash (e.g., action 643, or 622 or 623). The proof of management process 640 may also include generating a proof of management hash (e.g., action 644). The proof of management process 640 may also include generating a signed proof of management hash (e.g., action 645). These and other actions of the proof of management process 640 will not be further described below.

Identifying or Forming an Owner Payload (e.g., Action 641, or 621).

In an example embodiment, the proof of management process 640 may include identifying or forming an owner payload (or first payload) for a digital asset (e.g., action 641, or 621). The owner payload may be formed in the same manner as described in action 621.

After identifying or forming the owner payload, the owner payload may be provided to other actions and/or processes, including the generating of the proof of ownership hash (e.g., action 643, or 622 or 623), the generating of the proof of management hash (e.g., action 644), and/or the proof of authority process 660. The formed owner payload may also be accessible or provided to the custodian 110 and/or database 130 in example embodiments. For example, the formed owner payload may be provided as input for generating the proof of authority hash (e.g., action 665).

Identifying or Forming a Custodian Payload (e.g., Action 642).

In an example embodiment, the proof of management process 640 may include identifying or forming a custodian payload (or second payload) for a digital asset (e.g., action 642). The custodian payload includes at least the public key of the custodian of the digital asset (and/or a corresponding public address for the public key of the custodian of the digital asset). In example embodiments, the custodian payload may also include a unique identifier (or custodian identifier), or the like, that can be used to uniquely, specifically, or unmistakably identify the custodian 110 of the digital asset. For example, the unique identifier may be a legal entity identifier (LEI) of the custodian 110. In some example embodiments, the custodian payload may also include other information including, but not limited to, a legal name of the custodian 110 (e.g., company name (cn) and organizational unit (ou) if the custodian 110 is a company with multiple organizational units); location of the custodian (e.g., city, state, province, and/or country); etc. The custodian payload may also include a format of the public address (e.g., when the custodian payload includes the public address for the public key of the custodian 110), an identification of a hashing algorithm used to generate the proof of management hash (as further described in the present disclosure), and/or an identification of the signature algorithm used to generate the signed proof of management hash (as further described in the present disclosure).

After the custodian payload is identified or formed, the custodian payload may be provided to other actions and/or processes, including the generating of the proof of management hash and/or the proof of authority process 660. The custodian payload may also be accessible or provided to the custodian 110 and/or database 130 in example embodiments. For example, the formed custodian payload may be used as input for generating the proof of authority hash.

Identifying or Generating the Proof of Ownership Hash and/or Signed Proof of Ownership Hash (e.g., Action 643, or 622 or 623).

In an example embodiment, the proof of management process 640 may include identifying or generating a proof of ownership hash and/or signed proof of ownership hash for the digital asset (e.g., action 643, or 622 or 623). The proof of ownership hash may be formed in the same manner as described in action 622. The signed proof of ownership hash may be formed in the same manner as described in action 623.

After identifying or generating the proof of ownership hash, the proof of ownership hash and the signed proof of ownership hash may be provided to other actions and/or processes, including, each as applicable, the generating of the signed proof of ownership hash (e.g., action 623), the proof of management process 640, and/or the proof of authority process 660. The generated proof of ownership hash may also be accessible or provided to the custodian 110 and/or database 130 in example embodiments.

Generating a Proof of Management Hash (e.g., Action 644).

In an example embodiment, the proof of management process 640 may include generating a proof of management hash for the digital asset (e.g., action 644). The proof of management hash may be generated by hashing one or more of the following: the owner payload (as described in the present disclosure); the custodian payload; the proof of ownership hash; and/or the signed proof of ownership hash. In preferred embodiments, the proof of management hash is generated by hashing the custodian payload and the signed proof of ownership hash. The hashing algorithm used may be any hashing algorithm including, but not limited to, SHA-256, SHA-3, etc. FIGS. 7B and 7C illustrate examples of a proof of management hash and hashing algorithm used for the hashing, which are depicted in FIG. 7B as "N/vQ9SwunTeJV19I38ETAUI1x3K2yE2NFFs7fD5Zd2k=" and "SHA-256", respectively. It is to be understood that any other hashing algorithm may be used to generate the proof of management hash without departing from the teachings of the present disclosure.

After the proof of management hash is generated, the proof of management hash may be provided to other actions and/or processes, including generating of the signed proof of management hash and the proof of authority process 660. The proof of management hash may also be accessible or provided to the custodian 110 and/or database 130 in example embodiments. For example, the generated proof of management hash may be provided as input for generating the proof of authority hash (e.g., action 665).

Generating a Signed Proof of Management Hash (e.g., Action 645).

In an example embodiment, the proof of management process 640 may include generating a signed proof of management hash (e.g., action 645). The signed proof of management hash may be generated by digitally signing the proof of management hash. In an example embodiment, the authorized custodian 110 performs the digital signing of the proof of management hash so as to generate the signed proof of management hash. The digital signature algorithm used may be any digital signature algorithm such as SHA-256 with ECDSA. FIG. 7B (and FIG. 7C) illustrate examples of a signed proof of management hash and digital signature algorithm used for the signing, which are depicted in FIG. 7B as "MEQCIEOu0eWeQ9033LvyqH7j/2EQuzGAKvvTQWFwMPVSLgWkAiBjppf-bIesKtbGeTdVxu NhC19BnxbxQK1+92gfyY9qCTw==" and "SHA-256withECDSA", respectively. It is to be understood that any other digital signature algorithm may be used to generate the signed proof of management hash without departing from the teachings of the present disclosure.

After the signed proof of management hash is generated, the signed proof of management hash may be provided to other actions and/or processes, including the proof of authority process 660. The signed proof of management hash may also be accessible or provided to the custodian 110 and/or database 130 in example embodiments. For example, the signed proof of management hash may be provided as input for generating the proof of authority hash.

The proof of Management Verification Process (e.g., Proof of Management Verification Process 650).

In an example embodiment, the proof of management verification process (e.g., proof of management verification process 650) may be used to verify a proof of management for a digital asset. More specifically, the proof of management verification process 650 may be used to cryptographic verify that a particular custodian 110 is the authorized custodian for a particular digital asset. For example, the proof of management verification process 650 may be used to verify that a public key of a particular digital asset and/or a public address of a public key of a particular digital asset (e.g., a crypto address such as a Bitcoin or BTC public address or ETH public address) is managed by (or in custody of) a particular custodian 110. In example embodiments, the proof of management verification process 650 may be used to verify that an entity (a particular custodian) is the authorized custodian of a particular digital asset without a need to reveal the private key of the digital asset.

Figure 6E:
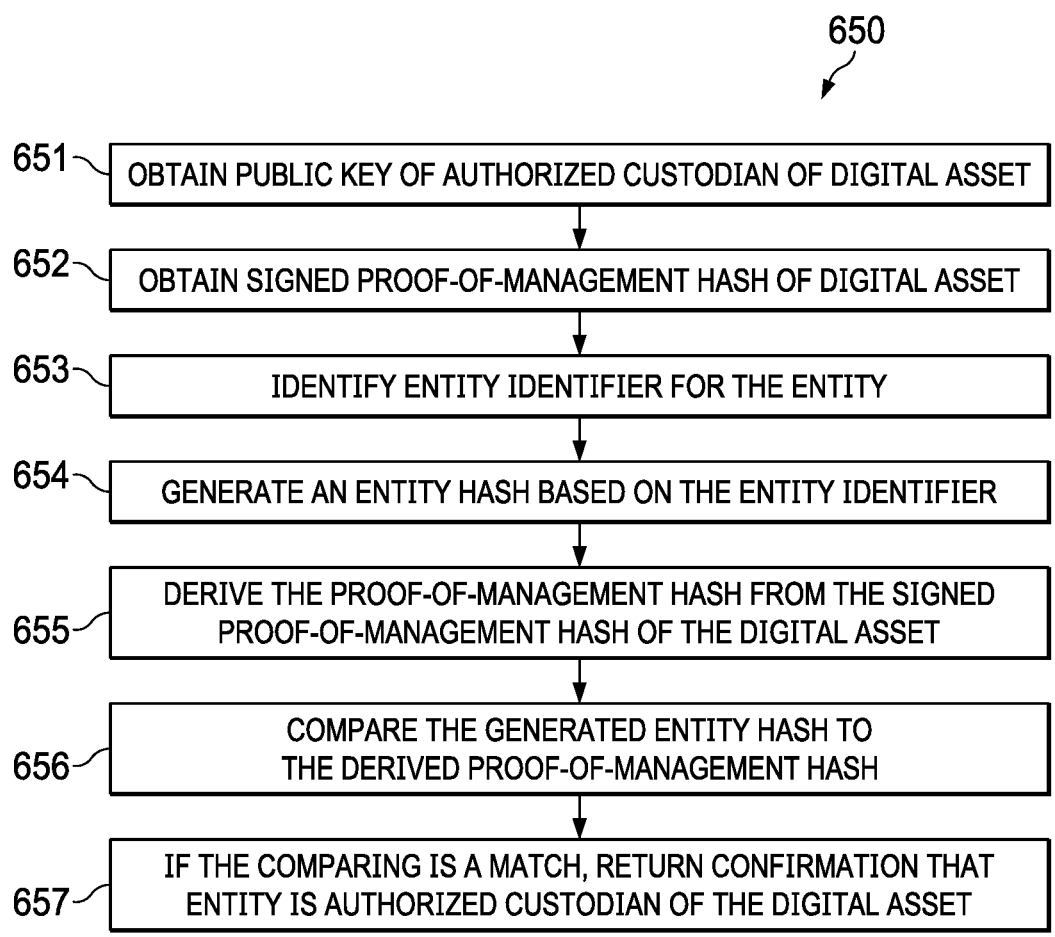
FIG. 6E is an illustration of an example embodiment of a proof of management verification process.

FIG. 6E illustrates an example embodiment of the proof of management verification process 650 to verify whether an entity is the authorized custodian of a digital asset. It should be noted that the "entity" may be any person, company, and/or other legal entity that is claiming to be the custodian of the digital asset (i.e., the entity that is being verified or checked so as to see whether such entity is indeed the custodian of the digital asset). The proof of management verification process 650 may include obtaining a public key of the authorized custodian (e.g., action 651). For example, the public key of the authorized custodian may be stored in and/or accessible/available (e.g., publicly available) from database 130. The proof of management verification process 650 may also include obtaining a signed proof of management hash of the digital asset (e.g., action 652) (e.g., obtaining from the database 130). The proof of management verification process 650 may also include identifying an entity identifier (and/or other information required to verify the entity) for the entity (e.g., action 653). The proof of management verification process 650 may also include generating an entity hash (e.g., action 654). The proof of management verification process 650 may also include deriving the proof of management hash from the signed proof of management hash of the digital asset (e.g., action 655). The proof of management verification process 650 may also include comparing the generated entity hash to the derived proof of management hash (e.g., action 656). The proof of management verification process 650 may also include returning confirmation that the entity is the authorized custodian of the digital asset when the comparing in action 656 is a match (e.g., action 657). These and other actions of the proof of management process 650 will not be further described below.

Obtaining a Public Key of the Authorized Custodian of the Digital Asset (e.g., Action 651).

In an example embodiment, the proof of management verification process 650 may include obtaining a public key of the authorized custodian of the digital asset (e.g., action 651). Alternatively or in addition, the proof of management verification process 650 may include obtaining a public address of the public key of the authorized custodian of the digital asset.

Obtaining a Signed Proof of Management Hash of the Digital Asset (e.g., Action 652).

In an example embodiment, the proof of management verification process 650 may include obtaining a signed proof of management hash of the digital asset (e.g., action 652). Alternatively or in addition, the proof of management verification process 650 may include obtaining the proof of management hash of the digital asset.

Identifying an Entity Identifier for the Entity (e.g., Action 653).

The proof of management verification process 650 may also include identifying an entity identifier for the entity that claims to be the authorized custodian of the digital asset (e.g., action 653). The entity identifier may include one or more forms of information pertaining to the entity, including the types or forms of information used in creating a custodian payload (as described above and in the present disclosure). For example, the entity identifier may be or include a legal entity identifier (LEI) of the entity. The entity identifier may also include a legal name of the entity (e.g., company name (cn) and organizational unit (ou) if the entity is a company with multiple organizational units); location of the entity (e.g., city, state, province, and/or country); a date and/or time stamp (e.g., creation time of the digital asset and/or payload); etc. The entity identifier may also include a format of the public address for the public key of the entity, hashing algorithm used to generate the proof of management hash, and/or signature algorithm used to generate the signed proof of management hash.

Generating an Entity Hash (e.g., Action 654)

The proof of management verification process 650 may also include generating an entity hash (e.g., action 654). The entity hash may be generated by hashing at least one or more of the following: the owner payload (the public key of the digital asset (and/or public address for the public key of the digital asset) and the owner identifier); the public key of the entity (and/or public address for the public key of the entity) and/or the entity identifier; hash of the owner payload (or proof of ownership hash); and/or signed hash of the owner payload (or signed proof of ownership hash). It is to be understood that the entity hash must be generated in view of the information used to generate the proof of management hash. For example, if the proof of management hash was generated by hashing the custodian payload and the signed proof of ownership hash, then the entity hash must also be generated by hashing the entity identifier (having the same type and quantity of information as the custodian payload; for example, if the custodian payload only includes the public key of the authorized custodian and a LEI for the authorized custodian, then the entity identifier should also include only the public key of the entity and the LEI for the entity) and the signed hash of the owner payload (or the signed proof of ownership hash). The hashing algorithm used to generate the entity hash is the hashing algorithm identified in action 653 (i.e., the hashing algorithm used to generate the proof of management hash).

Deriving the Proof of Management Hash from the Signed Proof of Management Hash of the Digital Asset (e.g., Action 655).

The proof of management verification process 650 may also include deriving the proof of management hash from the signed proof of management hash of the digital asset (e.g., action 655). The proof of management hash may be derived by decrypting, using the public key of the authorized custodian of the digital asset, the signed proof of management hash.

Comparing the Generated Entity Hash to the Derived Proof of Management Hash (e.g., Action 656).

The proof of management verification process 650 may also include comparing the generated entity hash to the derived proof of management hash (e.g., action 656). More specifically, the entity hash generated in action 654 is compared with the proof of management hash derived in action 655.

Returning Confirmation that the Entity is the Authorized Custodian of the Digital Asset when the Comparing in Action 656 is a Match (e.g., Action 657).

The proof of management verification process 650 may also include returning a confirmation that the entity is the custodian of the digital asset when the comparing of the generated entity hash (from action 654) to the derived proof of management hash (from action 655) is a match. More specifically, if the entity hash generated in action 654 matches the proof of management hash, then the entity is proven to be the custodian of the digital asset.

The proof of management verification process 650 may also include returning a confirmation that the entity is not the custodian of the digital asset when the comparing of the generated entity hash to the derived proof of management hash is not a match. More specifically, if the entity hash generated in action 654 is not a match to the proof of management hash, then the entity is not proven to be the custodian of the digital asset.

Another Example Embodiment of a Proof of Management Verification Process.

Another example embodiment of the proof of management verification process, which is used to verify whether or not an entity is the custodian of a digital asset, may include obtaining a public key of the authorized custodian of the digital asset. For example, the public key of the authorized custodian may be stored in and/or accessible/available (e.g., publicly available) from database 130. The proof of management verification process may also include obtaining a signed proof of management hash of the digital asset (e.g., obtaining from the database 130). In addition to obtaining the signed proof of management hash of the digital asset, the proof of management verification process may also include obtaining a proof of management hash of the digital asset. The proof of management verification process may also include obtaining the proof of ownership of the digital asset and/or signed proof of ownership hash of the digital asset (e.g., obtaining from the database 130). The proof of management verification process may also include obtaining the public key of the entity claiming to be the custodian of the digital asset. The proof of management verification process may also include hashing the obtained proof of ownership hash and/or signed proof of ownership hash of the digital asset to generate an entity hash in the same manner as described above for the proof of management hash (and using the same hashing algorithm as used for the proof of management hash). The proof of management verification process may also include using the public key of the entity claiming to be the custodian of the digital asset, the entity hash (and/or the proof of management hash), and the signed proof of management hash of the digital asset to verify that the signed proof of management hash was indeed signed by the private key of the authorized custodian (e.g., by using the public key of the entity claiming to be the custodian of the digital asset and applying it to the signed proof of management hash).

The Proof of Authority Process or Proof of Authority Setup Process (e.g., Proof of Authority Process 660).

In an example embodiment, the proof of authority process or proof of authority setup process (e.g., proof of authority process 660) may be used to create a proof of authority for a digital asset. More specifically, the proof of authority process 660 may be used to create a cryptographic proof (or may be used to cryptographically prove) that a particular custodian has been authorized by the owner of a particular digital asset to be the authorized custodian of the digital asset (it is to be understood in the present disclosure that another legal person may be authorized by the owner to authorize the custodian to be the authorized custodian of the digital asset, in which case the proof of authority process 660 is used to create a cryptographic proof that a particular custodian has been authorized by that legal person (who is authorized by the owner of the digital person) to be the authorized custodian of the digital asset). For example, the proof of authority for a particular digital asset may be proof (or may be used to prove) that the owner of a particular digital asset having a particular public key and/or public address has authorized a particular custodian to be the authorized custodian of the digital asset. In example embodiments, the proof of authority process may be used to prove that the owner of a particular digital asset has authorized a particular custodian to be the authorized custodian of the digital asset without a need to reveal the private key of the digital asset. As will be further described in the present disclosure, the proof of authority for a particular digital asset may be in the form of (or may include) a digitally signed hash of one of the following: at least the owner payload (as described in the present disclosure) and the custodian payload (as described in the present disclosure); or at least the proof of management hash; or at least the signed proof of management hash.

The proof of authority of a digital asset can be used to prove whether or not an entity who claims to be the authorized custodian of a digital asset has in fact been authorized by the owner of the digital asset to be the authorized custodian of the digital asset. The proof of authority of a digital asset will include a signed proof of authority hash. The proof of authority of a digital asset may also include a proof of authority hash. The proof of authority of a digital asset may also include the public key (or corresponding public address of the public key) of the digital asset.

Figure 6F:
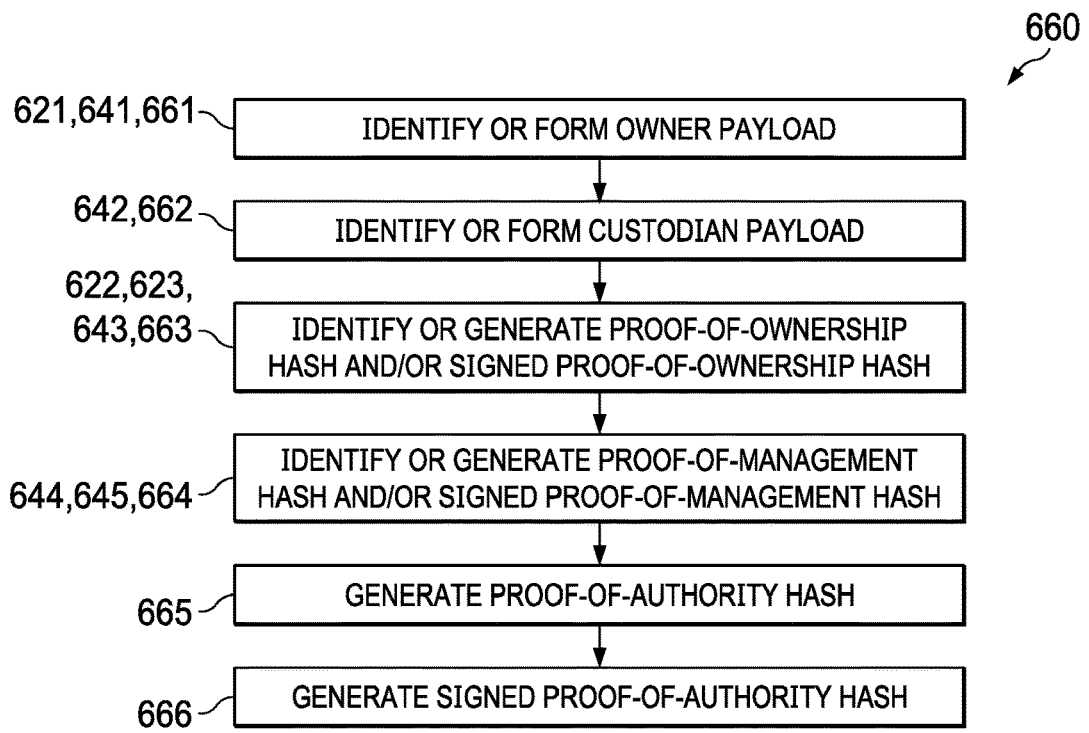
FIG. 6F is an illustration of an example embodiment of a proof of authority process or proof of authority setup process.

FIG. 6F illustrates an example embodiment of the proof of authority process 660. The proof of authority process 660 may include identifying or forming an owner payload (e.g., action 661, or 621 or 641). The proof of authority process 660 may also include identifying or forming a custodian payload (e.g., action 662, or 642). The proof of authority process 660 may also include identifying or generating a proof of ownership hash and/or a signed proof of ownership hash (e.g., action 663, or 622 or 623 or 643). The proof of authority process 660 may also include identifying or generating a proof of management hash and/or a signed proof of management hash (e.g., action 664, or 644 or 645). The proof of authority process 660 may also include generating a proof of authority hash (e.g., action 665). The proof of authority process 660 may also include generating a signed proof of authority hash (e.g., action 666). These elements of the proof of authority process 660 will now be further described with reference to the accompanying drawings.

Identifying or Forming an Owner Payload (e.g., Action 661, or 621 or 641).

In an example embodiment, the proof of authority process 660 may include identifying or forming an owner payload (or first payload) for a digital asset (e.g., action 661, or 621 or 641). The owner payload may be formed in the same manner as described in actions 621 or 641.

After identifying or forming the owner payload, the owner payload may be provided to other actions and/or processes, including the generating of the proof of ownership hash (e.g., action 663, or 622 or 623 or 643), the generating of the proof of management hash (e.g., action 664, or 644), and/or the proof of authority process 660. The formed owner payload may also be accessible or provided to the custodian 110 and/or database 130 in example embodiments. For example, the formed owner payload may be provided as input for generating the proof of authority hash (e.g., action 665).

Identifying or Forming a Custodian Payload (e.g., Action 662, or 642).

In an example embodiment, the proof of authority process 660 may include identifying or forming a custodian payload (or second payload) for a digital asset (e.g., action 662, or 642). The custodian payload may be formed in the same manner as described in action 642.

After the custodian payload is identified or formed, the custodian payload may be provided to other actions and/or processes, including the generating of the proof of management hash and/or the proof of authority process 660. The custodian payload may also be accessible or provided to the custodian 110 and/or database 130 in example embodiments. For example, the formed custodian payload may be used as input for generating the proof of authority hash (e.g., action 665).

Identifying or Generating the Proof of Ownership Hash and/or Signed Proof of Ownership Hash (e.g., Action 663, or 622 or 623 or 643).

In an example embodiment, the proof of authority process 660 may include identifying or generating a proof of ownership hash and/or signed proof of ownership hash for the digital asset (e.g., action 663, or 622 or 623 or 643). The proof of ownership hash may be formed in the same manner as described in action 622. The signed proof of ownership hash may be formed in the same manner as described in action 623.

After identifying or generating the proof of ownership hash, the proof of ownership hash and the signed proof of ownership hash may be provided to other actions and/or processes, including, each as applicable, the generating of the signed proof of ownership hash (e.g., action 623), the proof of management process 640, and/or the proof of authority process 660. The generated proof of ownership hash may also be accessible or provided to the custodian 110 and/or database 130 in example embodiments.

Identifying or Generating a Proof of Management Hash and/or Signed Proof of Management Hash (e.g., Action 664, or 644 or 645).

In an example embodiment, the proof of authority process 660 may include identifying or generating a proof of management hash and/or signed proof of management hash for the digital asset (e.g., action 664, or 644 or 645). The proof of management hash may be formed in the same manner as described in action 644. The signed proof of management hash may be formed in the same manner as described in action 645.

After identifying or generating the proof of management hash, the proof of management hash and the signed proof of management hash may be provided to other actions and/or processes, including, each as applicable, the proof of management process 640 and/or the proof of authority process 660. The generated proof of management hash may also be accessible or provided to the custodian 110 and/or database 130 in example embodiments.

Generating a Proof of Authority Hash (e.g., Action 665).

In an example embodiment, the proof of authority process 660 may include generating a proof of authority hash for the digital asset (e.g., action 665). The proof of authority hash may be generated by hashing at least the owner payload and the custodian payload. The proof of authority hash may also be generated by hashing at least the proof of management hash (e.g., as generated in action 664 or 644). The proof of authority hash may also be generated by hashing at least the signed proof of management hash (e.g., as generated in action 664 or 645). In preferred embodiments, the proof of authority hash is generated by hashing the signed proof of management hash. The hashing algorithm used may be any hashing algorithm including, but not limited to, SHA-256, SHA-3, etc. FIGS. 7C illustrates examples of a proof of authority hash and hashing algorithm used for the hashing, which are depicted in FIG. 7C as "jbAe0yuxqZcP7EMNjdXbq8PSJqKcZSH8A8e3xsD718I=" and "SHA-256", respectively. It is to be understood that any other hashing algorithm may be used to generate the proof of authority hash without departing from the teachings of the present disclosure.

After the proof of authority hash is generated, the proof of authority hash may be provided as input for the generating of the signed proof of authority hash (e.g., action 666). The proof of authority hash may also be accessible or provided to the custodian 110 and/or database 130 in example embodiments.

Generating a Signed Proof of Authority Hash (e.g., Action 666).

In an example embodiment, the proof of authority process 660 may include generating a signed proof of authority hash for the digital asset (e.g., action 666). The signed proof of authority hash may be generated by digitally signing the proof of authority hash. In an example embodiment, the owner 102 of the digital asset performs the digital signing of the proof of authority hash so as to generate the signed proof of authority hash. The digital signature algorithm used may be any digital signature algorithm such as SHA-256 with ECDSA. FIG. 7C illustrates an example of a signed proof of authority hash and digital signature algorithm used for the signing, which are depicted in FIG. 7C as "MEYCIQCml1IT4coa+4/0+u2iEpu7TV1EFKM1OtOe10/1vKzTXLQIhAKESNP163qrY1Uu2b0wFi EgXcb4wOU+uqR7Vb8gbtYOL" and "SHA-256withECDSA", respectively. It is to be understood that any other digital signature algorithm may be used to generate the signed proof of authority hash without departing from the teachings of the present disclosure.

After the signed proof of authority hash is generated, the signed proof of authority hash may be provided to the I/O interface 121 and/or the database interface 129.

The Proof of Authority Verification Process (e.g., Proof of Authority Verification Process 670).

In an example embodiment, the proof of authority verification process (e.g., proof of authority verification process 670) may be used to verify a proof of authority for a digital asset. More specifically, the proof of authority verification process 670 may be used to cryptographic verify that a particular custodian 110 has been authorized by the owner of a particular digital asset to be the authorized custodian for the digital asset. For example, the proof of authority verification process 670 may be used to verify that the owner of a particular digital asset has authorized a particular custodian 110 to manage or be the authorized custodian of a particular digital asset having a particular public key and/or a public address. In example embodiments, the proof of authority verification process 670 may be used to verify that a particular custodian has been authorized by the owner of a particular digital asset to be the authorized custodian of the digital asset without a need to reveal the private key of the digital asset.

Figure 6G:
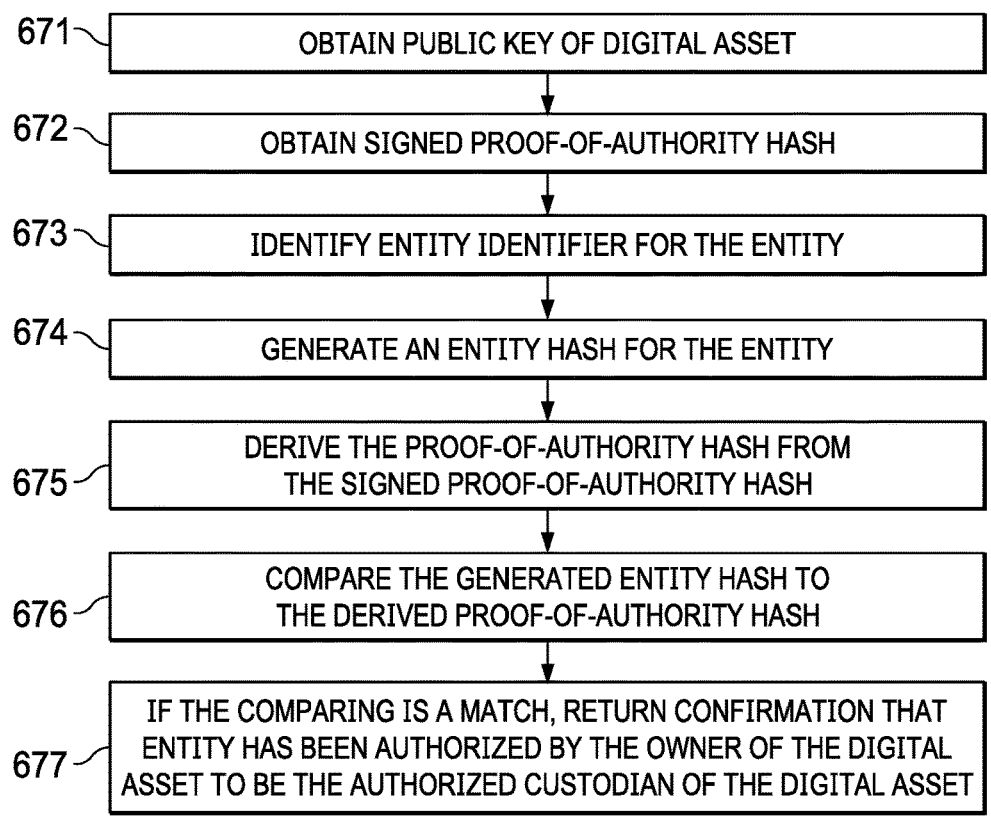
FIG. 6G is an illustration of an example embodiment of a proof of authority verification process.

FIG. 6G illustrates an example embodiment of the proof of authority verification process 670 to verify whether an entity has been authorized by the owner of a digital asset to be the authorized custodian of the digital asset. It should be noted that the "entity" may be any person, company, and/or other legal entity that is claiming to be authorized by the owner of the digital asset to be the custodian of the digital asset (i.e., the entity that is being verified or checked so as to see whether such entity has indeed been authorized by the owner of the digital asset to be the custodian of the digital asset). The proof of authority verification process 670 may include obtaining a public key of the digital asset (e.g., action 671). For example, the public key of the digital asset may be stored in and/or accessible/available (e.g., publicly available) from database 130. The proof of authority verification process 670 may also include obtaining a signed proof of authority hash of the digital asset (e.g., action 672) (e.g., obtaining from the database 130). The proof of authority verification process 670 may also include identifying an entity identifier (and/or other information required to verify the entity) for the entity (e.g., action 673). The proof of authority verification process 670 may also include generating an entity hash (e.g., action 674). The proof of authority verification process 670 may also include deriving the proof of authority hash from the signed proof of authority hash of the digital asset (e.g., action 675). The proof of authority verification process 670 may also include comparing the generated entity hash to the derived proof of authority hash (e.g., action 676). The proof of authority verification process 670 may also include returning confirmation that the entity has been authorized by the owner of the digital asset to be the authorized custodian of the digital asset when the comparing in action 676 is a match (e.g., action 677). These and other actions of the proof of authority process 670 will not be further described below.

Obtaining a Public Key of the of the Digital Asset (e.g., Action 671).

In an example embodiment, the proof of authority verification process 670 may include obtaining a public key of the digital asset (e.g., action 671). Alternatively or in addition, the proof of authority verification process 670 may include obtaining a public address of the public key of the digital asset.

Obtaining a Signed Proof of Authority Hash of the Digital Asset (e.g., Action 672).

In an example embodiment, the proof of authority verification process 670 may include obtaining a signed proof of authority hash of the digital asset (e.g., action 672). Alternatively or in addition, the proof of authority verification process 670 may include obtaining the proof of authority hash of the digital asset.

Identifying an Entity Identifier for the Entity (e.g., Action 673).

The proof of authority verification process 670 may also include identifying an entity identifier for the entity that claims to have been authorized by the owner of the digital asset to be the authorized custodian of the digital asset (e.g., action 653). The entity identifier may include one or more forms of information pertaining to the entity, including the types or forms of information used in creating a custodian payload (as described above and in the present disclosure). For example, the entity identifier may be or include a legal entity identifier (LEI) of the entity. The entity identifier may also include a legal name of the entity (e.g., company name (cn) and organizational unit (ou) if the entity is a company with multiple organizational units); location of the entity (e.g., city, state, province, and/or country); a date and/or time stamp (e.g., creation time of the digital asset and/or payload); etc. The entity identifier may also include a format of the public address for the public key of the entity, hashing algorithm used to generate the proof of authority hash, and/or signature algorithm used to generate the signed proof of authority hash.

Generating an Entity Hash (e.g., Action 674)

The proof of authority verification process 670 may also include generating an entity hash (e.g., action 674). The entity hash may be generated by hashing the owner payload and the public key of the entity (and/or public address for the public key of the entity and/or the entity identifier). The entity hash may also be generated by hashing a hash of at least one of the following: the first payload, the public key of the entity (and/or the public address for the public key of the entity and/or the entity identifier), a hash of at least the owner payload, and/or a signed hash of at least the owner payload. The entity hash may also be generated by hashing a signed entity hash. The signed entity hash may a digitally signed (by the entity) hash of at least one of the following: the owner payload, the public key of the entity (and/or the public address for the public key of the entity and/or the entity identifier), a hash of at least the owner payload, and a signed hash of at least the owner payload. It is to be understood that the entity hash must be generated in view of the information used to generate the proof of authority hash. For example, if the proof of authority hash was generated by hashing the custodian payload and the signed proof of management hash, then the entity hash must also be generated by hashing the entity identifier (having the same type and quantity of information as the custodian payload; for example, if the custodian payload only includes the public key of the authorized custodian and a LEI for the authorized custodian, then the entity identifier should also include only the public key of the entity and the LEI for the entity) and the signed proof of management hash. The hashing algorithm used to generate the entity hash is the hashing algorithm identified in action 673 (i.e., the hashing algorithm used to generate the proof of authority hash).

Deriving the Proof of Authority Hash from the Signed Proof of Authority Hash of the Digital Asset (e.g., Action 675).

The proof of authority verification process 670 may also include deriving the proof of authority hash from the signed proof of authority hash of the digital asset (e.g., action 675). The proof of authority hash may be derived by decrypting, using the public key of the digital asset, the signed proof of authority hash.

Comparing the Generated Entity Hash to the Derived Proof of Authority Hash (e.g., Action 676).

The proof of authority verification process 670 may also include comparing the generated entity hash to the derived proof of authority hash (e.g., action 676). More specifically, the entity hash generated in action 674 is compared with the proof of authority hash derived in action 675.

Returning Confirmation that the Entity has Been Authorized by the Owner of the Digital Asset to be the Authorized Custodian of the Digital Asset when the Comparing in Action 676 is a Match (e.g., Action 677).

The proof of authority verification process 670 may also include returning a confirmation that the entity has been authorized by the owner of the digital asset to be the custodian of the digital asset when the comparing of the generated entity hash (from action 674) to the derived proof of authority hash (from action 675) is a match. More specifically, if the entity hash generated in action 674 matches the proof of authority hash, then the entity is proven to have been authorized by the owner of the digital asset to be the custodian of the digital asset.

The proof of authority verification process 670 may also include returning a confirmation that the entity has not been authorized by the owner of the digital asset to be the custodian of the digital asset when the comparing of the generated entity hash to the derived proof of authority hash is not a match. More specifically, if the entity hash generated in action 674 is not a match to the proof of authority hash, then the entity is not proven to have been authorized by the owner of the digital asset to be the custodian of the digital asset.

Another Example Embodiment of a Proof of Authority Verification Process.

Another example embodiment of the proof of authority verification process, which is used to verify whether or not an entity has been authorized by the owner of the digital asset to be the custodian of the digital asset, may include obtaining a public key of the digital asset. For example, the public key of the digital asset may be stored in and/or accessible/available (e.g., publicly available) from database 130. The proof of authority verification process may also include obtaining a signed proof of authority hash of the digital asset (e.g., obtaining from the database 130). In addition to obtaining the signed proof of authority hash of the digital asset, the proof of authority verification process may also include obtaining a proof of authority hash of the digital asset. The proof of authority verification process may also include obtaining a proof of management hash and/or a signed proof of management hash of the digital asset (e.g., obtaining from the database 130). Alternatively or in addition, the proof of authority verification process may include obtaining the proof of ownership hash and/or signed proof of ownership hash of the digital asset (e.g., obtaining from the database 130), obtaining the public key of the authorized custodian (e.g., obtaining from the database 130), and generating (or verifying) the proof of management hash and/or signed proof of management hash using the obtained proof of ownership hash and/or signed proof of ownership hash (in the same manner as described above and in the present disclosure).

The proof of authority verification process may also include identifying an entity identifier (and/or other information required to verify the entity) for the entity who is claiming to be the owner of the digital asset who authorized the custodian to be the authorized custodian of the digital asset (it is to be understood in the present disclosure that the entity may also be a legal person who is claiming to be authorized by the owner to authorize the custodian to be the authorized custodian of the digital asset). The proof of authority verification process may also include generating an entity hash for the proof of management hash and/or signed proof of management hash in the same manner as described above and in the present disclosure for the proof of authority hash (and using the same hashing algorithm as used for the proof of authority hash). The proof of authority verification process may also include comparing the generated entity hash to the obtained proof of authority hash of the digital asset (e.g., as obtained from database 130). If the comparing does not result in a match, the proof of authority verification process has verified that the entity has not been authorized by the owner to be the custodian of the digital asset. If the comparing results in a match, the proof of authority verification process may also include using the public key of the digital asset, the entity hash (and/or the proof of authority hash), and the signed proof of authority hash of the digital asset to verify that the signed proof of authority hash was indeed signed by the private key of the digital asset (e.g., by using the public key of the digital asset and applying it to the signed proof of authority hash).

While various embodiments in accordance with the disclosed principles have been described above, it should be understood that they have been presented by way of example only, and are not limiting. Thus, the breadth and scope of the example embodiments described in the present disclosure should not be limited by any of the above-described exemplary embodiments, but should be defined only in accordance with the claims and their equivalents issuing from this disclosure. Furthermore, the above advantages and features are provided in described embodiments, but shall not limit the application of such issued claims to processes and structures accomplishing any or all of the above advantages.

For example, "communication," "communicate," "connection," "connect," or other similar terms should generally be construed broadly to mean a wired, wireless, and/or other form of, as applicable, connection between elements, devices, computing devices, telephones, processors, controllers, servers, networks, telephone networks, the cloud, and/or the like, which enable voice and/or data to be sent, transmitted, broadcasted, received, intercepted, acquired, and/or transferred (each as applicable).

Furthermore, a digital asset (as used in the present disclosure) is a term known in the art and, where applicable, may include and/or broadly and equivalently refer to cryptocurrencies, digital tokens, security-backed tokens, unsecured tokens, utility tokens, stablecoins, altcoins, public key and private key pairs, smart contracts, RSA, and the like. Furthermore, hashing (as used in the present disclosure), or the like, is a term known in the art and, where applicable, may include and/or broadly and equivalently refer to a transformation or mapping of an input into a fixed-length string or series of characters (e.g., by using a hashing algorithm, hashing function, or the like). Similarly, a hash (as used in the present disclosure) is a term known in the art and, where applicable, may include and/or broadly refer to a fixed-length string or series of characters resulting from the hashing of an input (e.g., by using a hashing algorithm (e.g., SHA-256), hashing function, or the like). Furthermore, encrypting, encryption, encrypt, and the like, are terms known in the art and, where applicable, may include and/or broadly and equivalently refer to a conversion of an input into a series of characters (or encrypted input) in such a way that the input can be readily recovered from the encrypted input (e.g., if an appropriate key is applied to decrypt the encrypted input). Furthermore, digitally signing, digital signing, digitally sign, signing, sign, and the like, are terms known in the art and, where applicable, may include and/or broadly and equivalently refer to creating digital signatures, including encrypting an input using a private key (i.e., for digital signatures, which is unlike the general approach of encrypting a message using a public key) so as to create a digital signature in such a manner that a recipient can, by applying a corresponding public key (i.e., a public key that corresponds to the private key used to create the digital signature; for digital signatures, the public key is used to decrypt the digital signature, which is unlike the general approach of decrypting a message using a private key), validate that the digital signature was signed (or encrypted) by the private key.

Also, as referred to herein, a processor, device, computing device, telephone, phone, server, gateway server, communication gateway server, and/or controller, may be any processor, computing device, and/or communication device, and may include a virtual machine, computer, node, instance, host, or machine in a networked computing environment. Also as referred to herein, a network or cloud may be or include a collection of machines connected by communication channels that facilitate communications between machines and allow for machines to share resources. Network may also refer to a communication medium between processes on the same machine. Also as referred to herein, a network element, node, or server may be a machine deployed to execute a program operating as a socket listener and may include software instances.

Database (or memory or storage) may comprise any collection and/or arrangement of volatile and/or non-volatile components suitable for storing data. For example, memory may comprise random access memory (RAM) devices, read-only memory (ROM) devices, magnetic storage devices, optical storage devices, solid state devices, and/or any other suitable data storage devices. In particular embodiments, database may represent, in part, computer-readable storage media on which computer instructions and/or logic are encoded. Database may represent any number of memory components within, local to, and/or accessible by a processor and/or computing device.

Various terms used herein have special meanings within the present technical field. Whether a particular term should be construed as such a "term of art" depends on the context in which that term is used. Such terms are to be construed in light of the context in which they are used in the present disclosure and as one of ordinary skill in the art would understand those terms in the disclosed context. The above definitions are not exclusive of other meanings that might be imparted to those terms based on the disclosed context.

Words of comparison, measurement, and timing such as "at the time," "equivalent," "during," "complete," and the like should be understood to mean "substantially at the time," "substantially equivalent," "substantially during," "substantially complete," etc., where "substantially" means that such comparisons, measurements, and timings are practicable to accomplish the implicitly or expressly stated desired result.

Additionally, the section headings and topic headings herein are provided for consistency with the suggestions under various patent regulations and practice, or otherwise to provide organizational cues. These headings shall not limit or characterize the embodiments set out in any claims that may issue from this disclosure. Specifically, a description of a technology in the "Background" is not to be construed as an admission that technology is prior art to any embodiments in this disclosure. Furthermore, any reference in this disclosure to "invention" in the singular should not be used to argue that there is only a single point of novelty in this disclosure. Multiple inventions may be set forth according to the limitations of the claims issuing from this disclosure, and such claims accordingly define the invention(s), and their equivalents, that are protected thereby. In all instances, the scope of such claims shall be considered on their own merits in light of this disclosure, but should not be constrained by the headings herein.

What is claimed is:

1. A method of managing a digital asset, the digital asset having a private key and a corresponding public key, the method comprising:
  identifying a first payload, the first payload including:
    the public key of the digital asset or a corresponding public address for the public key of the digital asset;
  identifying a second payload, the second payload including at least one of:
    a public key of an authorized custodian of the digital asset or a corresponding public address for the public key of the authorized custodian of the digital asset; and
    a custodian identifier, the custodian identifier being a unique identifier for use in identifying the authorized custodian of the digital asset;

identifying at least one of a proof of ownership hash for the digital asset and a signed proof of ownership hash for the digital asset;
performing a proof of management setup process for the custodian of the digital asset, the proof of management setup process including:
  generating a proof of management hash, the proof of management hash generated by hashing at least one of the following:
    the first payload;
    the second payload;
    the proof of ownership hash; and
    the signed proof of ownership hash; and
  signing, by the authorized custodian of the digital asset, the proof of management hash to arrive at a signed proof of management hash;
performing a proof of authority setup process, the proof of authority setup process including:
  generating a proof of authority hash, the proof of authority hash generated by hashing at least the signed proof of management hash; and
  signing, by an owner of the digital asset, the proof of authority hash to arrive at a signed proof of authority hash; and
performing a proof of management verification process, the proof of management verification process for determining whether an entity is the authorized custodian of the digital asset, the proof of management verification process including:
  obtaining the public key of the authorized custodian of the digital asset;
  obtaining the signed proof of management hash;
  identifying an entity identifier for the entity, the entity identifier being a unique identifier for use in identifying the entity;
  generating an entity hash, the entity hash generated by hashing at least one or more of the following:
    the first payload;
    at least one of the following:
      a public key of the entity or a corresponding public address for the public key of the entity; and
      the entity identifier;
    a hash of at least the first payload; and
    a signed hash of at least the first payload;
  deriving the proof of management hash from the signed proof of management hash, the deriving including decrypting, using the public key of the authorized custodian of the digital asset, the signed proof of management hash;
  comparing the generated entity hash to the derived proof of management hash; and
  responsive to a determination that the entity hash matches the proof of management hash, returning a confirmation that the entity is the authorized custodian of the digital asset.

2. The method of claim 1, wherein at least one of the following apply:
  the proof of ownership hash is a hash generated by hashing at least the first payload;
  the signed proof of ownership hash is obtained by signing, using the private key of the digital asset, the proof of ownership hash; and
  the first payload includes an owner identifier, the owner identifier being a unique identifier for use in identifying an owner of the digital asset.

3. The method of claim 2, wherein at least one of the following apply:
  the owner identifier includes a legal entity identifier (LEI); and
  the owner identifier includes a legal name of the owner of the digital asset.

4. The method of claim 1, wherein prior to generating the entity hash:
  identifying a hashing algorithm used to generate the proof of management hash; and
  using the identified hashing algorithm to generate the entity hash.

5. The method of claim 1, further comprising:
  performing a proof of authority setup process, the proof of authority setup process including:
    generating a proof of authority hash, the proof of authority hash generated by hashing at least one of the following:
      the first payload and the second payload;
      the proof of management hash;
      the signed proof of management hash; and
    signing, by an owner of the digital asset, the proof of authority hash to arrive at a signed proof of authority hash.

6. A method of managing a digital asset, the digital asset having a private key and a corresponding public key, the method comprising:
  identifying a first payload, the first payload including:
    the public key of the digital asset or a corresponding public address for the public key of the digital asset;
  identifying a second payload, the second payload including at least one of:
    a public key of an authorized custodian of the digital asset or a corresponding public address for the public key of the authorized custodian of the digital asset; and
    a custodian identifier, the custodian identifier being a unique identifier for use in identifying the authorized custodian of the digital asset;
  identifying a proof of ownership hash for at least one of the digital asset and a signed proof of ownership hash for the digital asset;
  identifying a proof of management hash for the digital asset and a signed proof of management hash for the digital asset;
  performing a proof of authority setup process, the proof of authority setup process including:
    generating a proof of authority hash, the proof of authority hash generated by hashing at least one of the following:
      the first payload and the second payload;
      the proof of management hash; or
      the signed proof of management hash; and
    signing, by an owner of the digital asset, the proof of authority hash to arrive at a signed proof of authority hash; and
  performing a proof of authority verification process, the proof of authority verification process for determining whether an entity has been authorized, by the owner of the digital asset, to be the authorized custodian of the digital asset, the proof of management verification process including:
    obtaining the public key of the digital asset;
    obtaining the signed proof of authority hash;
    identifying an entity identifier for the entity, the entity identifier being a unique identifier for use in identifying the entity;

generating an entity hash, the entity hash generated by hashing at least one of the following:
the first payload and at least one of the following:
a public key of the entity or a corresponding public address for the public key of the entity; and
the entity identifier;
a hash of at least one of the following:
the first payload;
at least one of the following: a public key of the entity or a corresponding public address for the public key of the entity; and the entity identifier;
a hash of at least the first payload; and
a signed hash of at least the first payload;
a signed entity hash, the signed entity hash being a digital signature, by the entity, of a hash of at least one of the following:
the first payload;
at least one of the following: a public key of the entity or a corresponding public address for the public key of the entity; and the entity identifier;
a hash of at least the first payload; and
a signed hash of at least the first payload;
deriving the proof of authority hash from the signed proof of authority hash, the deriving including decrypting, using the public key of the digital asset, the signed proof of authority hash;
comparing the generated entity hash to the derived proof of authority hash; and
responsive to a determination that the entity hash matches the proof of authority hash, returning a confirmation that the entity has been authorized, by the owner of the digital asset, to be the authorized custodian of the digital asset.

7. The method of claim 6, wherein at least one of the following apply:
the proof of ownership hash is a hash generated by hashing at least the first payload;
the signed proof of ownership hash is obtained by signing, using the private key of the digital asset, the proof of ownership hash; and
the first payload includes an owner identifier, the owner identifier being a unique identifier for use in identifying the owner of the digital asset.

8. The method of claim 7, wherein at least one of the following apply:
the owner identifier includes a legal entity identifier (LEI); and
the owner identifier includes a legal name of the owner of the digital asset.

9. The method of claim 6, wherein at least one of the following apply:
the proof of management hash is a hash generated by hashing at least one of the following:
the first payload;
the second payload;
the proof of ownership hash; and
the signed proof of ownership hash; and
the signed proof of management hash is obtained by signing, by the authorized custodian, the digital asset.

10. The method of claim 6, wherein prior to generating the entity hash:
identifying a hashing algorithm used to generate the proof of authority hash; and
using the identified hashing algorithm to generate the entity hash.

11. A method of managing a digital asset, the digital asset having a private key and a corresponding public key, the method comprising:
forming a first payload, the first payload including:
the public key of the digital asset or a corresponding public address for the public key of the digital asset;
forming a second payload, the second payload including at least one of:
a public key of an authorized custodian of the digital asset and a corresponding public address for the public key of the authorized custodian of the digital asset; and
a custodian identifier, the custodian identifier being a unique identifier for use in identifying the authorized custodian of the digital asset;
performing a proof of ownership setup process for an owner of the digital asset, the proof of ownership setup process including:
generating a proof of ownership hash, the proof of ownership hash generated by hashing at least the first payload; and
signing, using the private key of the digital asset, the proof of ownership hash to arrive at a signed proof of ownership hash;
performing a proof of management setup process for the authorized custodian of the digital asset, the proof of management setup process including:
generating a proof of management hash, the proof of management hash generated by hashing at least one of the following:
the first payload;
the second payload;
the proof of ownership hash; and
the signed proof of ownership hash; and
signing, by the authorized custodian of the digital asset, the proof of management hash to arrive at a signed proof of management hash;
performing a proof of authority setup process, the proof of authority setup process including:
generating a proof of authority hash, the proof of authority hash generated by hashing at least one of the following:
the first payload and the second payload;
the proof of management hash; or
the signed proof of management hash; and
signing, by the owner of the digital asset, the proof of authority hash to arrive at a signed proof of authority hash; and
performing a proof of ownership verification process, the proof of ownership verification process for determining whether an entity is the owner of the digital asset, the proof of ownership verification process including:
obtaining the public key of the digital asset;
obtaining the signed proof of ownership hash;
identifying an entity identifier for the entity, the entity identifier being a unique identifier for use in identifying the entity;
generating an entity hash, the entity hash generated by hashing at least:
the public key of the digital asset or the corresponding public address for the public key of the digital asset; and
the entity identifier;
deriving the proof of ownership hash from the signed proof of ownership hash, the deriving including decrypting, using the public key of the digital asset, the signed proof of ownership hash;

comparing the generated entity hash to the derived proof of ownership hash; and responsive to a determination that the entity hash matches the proof of ownership hash, returning a confirmation that the entity is the owner of the digital asset.

12. The method of claim 11, wherein the first payload further includes one or more of the following:
   a date stamp;
   a time stamp;
   when the first payload includes the public address, an identification of a format of the public address;
   an identification of a hashing algorithm used to generate the proof of ownership hash; and
   an identification of a signature algorithm used to sign the proof of ownership hash.

13. The method of claim 11, wherein the first payload further includes an owner identifier, the owner identifier being a unique identifier for use in identifying the owner of the digital asset.

14. The method of claim 13, wherein at least one of the following apply:
   the owner identifier includes a legal entity identifier (LEI); and
   the owner identifier includes a legal name of the owner of the digital asset.

15. The method of claim 11, wherein prior to generating the entity hash:
   identifying a hashing algorithm used to generate the proof of ownership hash; and
   using the identified hashing algorithm to generate the entity hash.

16. The method of claim 11, further comprising performing, after performing the proof of management setup process, a proof of management verification process, the proof of management verification process for determining whether an entity is the authorized custodian of the digital asset, the proof of management verification process comprising:
   obtaining the public key of the authorized custodian of the digital asset;
   obtaining the signed proof of management hash;
   identifying an entity identifier for the entity, the entity identifier being a unique identifier for use in identifying the entity;
   generating an entity hash, the entity hash generated by hashing at least one of the following:
      the first payload;
      at least one of the following:
         a public key of the entity or a corresponding public address for the public key of the entity; and
         the entity identifier;
      a hash of at least the first payload; and
      a signed hash of at least the first payload; and
   deriving the proof of management hash from the signed proof of management hash, the deriving including decrypting, using the public key of the authorized custodian of the digital asset, the signed proof of management hash;
   comparing the generated entity hash to the derived proof of management hash; and
   responsive to a determination that the entity hash matches the proof of ownership hash, returning a confirmation that the entity is the authorized custodian of the digital asset.

17. The method of claim 16, wherein prior to generating the entity hash:
   identifying a hashing algorithm used to generate the proof of management hash; and
   using the identified hashing algorithm to generate the entity hash.

18. The method of claim 11, further comprising performing, after performing the proof of authority setup process, a proof of authority verification process, the proof of authority verification process for determining whether an entity has been authorized, by the owner of the digital asset, to be the authorized custodian of the digital asset, the proof of management verification process comprising:
   obtaining the public key of the digital asset;
   obtaining the signed proof of authority hash;
   identifying an entity identifier for the entity, the entity identifier being a unique identifier for use in identifying the entity;
   generating an entity hash, the entity hash generated by hashing one of the following:
      the first payload and at least one of the following:
         a public key of the entity or a corresponding public address for the public key of the entity; and
         the entity identifier;
      a hash of at least one of the following:
         the first payload;
         one or more of the following:
            a public key of the entity or a corresponding public address for the public key of the entity; and
            the entity identifier;
         a hash of at least the first payload; and
         a signed hash of at least the first payload;
      a signed entity hash, the signed entity hash being a digital signature, by the entity, of a hash of at least one of the following:
         the first payload;
         at least one of the following:
            a public key of the entity or a corresponding public address for the public key of the entity; and
            the entity identifier;
         a hash of at least the first payload; and
         a signed hash of at least the first payload;
   deriving the proof of authority hash from the signed proof of authority hash, the deriving including decrypting, using the public key of the digital asset, the signed proof of authority hash;
   comparing the generated entity hash to the derived proof of authority hash; and
   responsive to a determination that the entity hash matches the proof of authority hash, returning a confirmation that the entity has been authorized, by the owner of the digital asset, to be the authorized custodian of the digital asset.

19. The method of claim 18, wherein prior to generating the entity hash, performing one or more of the following:
   identifying a hashing algorithm used to generate the proof of authority hash, and using the identified hashing algorithm to generate the entity hash.

20. The method of claim 11, further comprising:
   performing a proof of ownership setup process for the authorized custodian of the digital asset, the proof of ownership setup process for the authorized custodian of the digital asset including:
      generating a second proof of ownership hash by hashing the second payload; and signing, using a private key of the authorized custodian of the digital asset, the second proof of ownership hash;

wherein the private key of the authorized custodian of the digital asset is the corresponding private key used to generate the public key of the authorized custodian of the digital asset.

\* \* \* \* \*